US012734728B2

(12) United States Patent
Tamura et al.

(10) Patent No.: US 12,734,728 B2
(45) Date of Patent: Sep. 15, 2026

(54) THERMOPLASTIC RESIN PELLETS AND METHOD FOR MANUFACTURING THERMOPLASTIC RESIN PELLETS

(71) Applicant: SUMITOMO CHEMICAL COMPANY, LIMITED, Tokyo (JP)

(72) Inventors: Tasuku Tamura, Chiba (JP); Takayuki Sugiyama, Tsukuba (JP); Soichiro Maruyama, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 89 days.

(21) Appl. No.: 18/688,967

(22) PCT Filed: Sep. 5, 2022

(86) PCT No.: PCT/JP2022/033268

§ 371 (c)(1), (2) Date: Mar. 4, 2024

(87) PCT Pub. No.: WO2023/033171

PCT Pub. Date: Mar. 9, 2023

(65) Prior Publication Data

US 2024/0367349 A1 Nov. 7, 2024

(30) Foreign Application Priority Data

Sep. 6, 2021 (JP) ................................ 2021-144889

(51) Int. Cl.

| | |
|---|---|
| ***B29B 9/06*** | (2006.01) |
| ***B29B 9/14*** | (2006.01) |
| ***B29K 67/00*** | (2006.01) |
| ***B29K 105/12*** | (2006.01) |
| ***B29K 507/04*** | (2006.01) |
| ***B29K 509/08*** | (2006.01) |
| ***C08K 7/06*** | (2006.01) |
| ***C08K 7/14*** | (2006.01) |

(52) U.S. Cl.

CPC .................. *B29B 9/06* (2013.01); *B29B 9/14* (2013.01); *B29K 2067/00* (2013.01);

(Continued)

(58) Field of Classification Search

CPC . B29C 65/4875; B29C 65/487; B29C 48/345; B29C 2045/0091; B29B 9/14; B29B 9/06

See application file for complete search history.

(56) References Cited

U.S. PATENT DOCUMENTS

2008/0042107 A1 2/2008 Czubarow et al.
2020/0385540 A1 12/2020 Konno et al.

(Continued)

FOREIGN PATENT DOCUMENTS

EP 3521346 A1 8/2019
EP 3885094 A1 9/2021

(Continued)

OTHER PUBLICATIONS

International Search Report issued in International Patent Application No. PCT/JP2022/033268, dated Oct. 4, 2022 w/ English Translation.

*Primary Examiner* — Stella K Yi
(74) *Attorney, Agent, or Firm* — Rimon P.C.

(57) ABSTRACT

There is provided a thermoplastic resin pellet containing a thermoplastic resin (A) and a fibrous filler (B), in which a length-weighted average fiber length of the fibrous filler (B) is 5 mm or more and less than 50 mm, a pellet length of the thermoplastic resin pellet and the length-weighted average fiber length of the fibrous filler (B) are substantially the same, and a maximum cross-sectional height Rt of a surface of the thermoplastic resin pellet is less than 120 μm.

5 Claims, 4 Drawing Sheets

(52) U.S. Cl.
CPC ...... *B29K 2105/12* (2013.01); *B29K 2507/04* (2013.01); *B29K 2509/08* (2013.01); *B29K 2995/0072* (2013.01); *C08K 7/06* (2013.01); *C08K 7/14* (2013.01); *C08K 2201/004* (2013.01)

(56) References Cited

U.S. PATENT DOCUMENTS

| | | | |
|---|---|---|---|
| 2022/0267591 | A1 | 8/2022 | Sugiyama et al. |
| 2022/0288823 | A1 | 9/2022 | Sugiyama et al. |
| 2022/0289925 | A1 | 9/2022 | Sugiyama et al. |
| 2022/0315696 | A1 | 10/2022 | Tamura et al. |

FOREIGN PATENT DOCUMENTS

| | | | |
|---|---|---|---|
| JP | 52-029856 | A | 3/1977 |
| JP | 05-162124 | A | 6/1993 |
| JP | 09-053005 | A | 2/1997 |
| JP | 2013-177007 | A | 9/2013 |
| WO | 2014/088267 | A1 | 6/2014 |
| WO | 2018/062139 | A1 | 4/2018 |
| WO | 2019/039458 | A1 | 2/2019 |
| WO | 2020/105607 | A1 | 5/2020 |
| WO | 2021/029109 | A1 | 2/2021 |
| WO | 2021/029265 | A1 | 2/2021 |
| WO | 2021/029271 | A1 | 2/2021 |
| WO | 2021/029275 | A1 | 2/2021 |
| WO | 2021/029276 | A1 | 2/2021 |

THERMOPLASTIC RESIN PELLETS AND METHOD FOR MANUFACTURING THERMOPLASTIC RESIN PELLETS

CROSS-REFERENCE TO RELATED APPLICATIONS

This application is the U.S. National Phase under 35 U.S.C. § 371 of International Application No. PCT/JP2022/033268, filed on Sep. 5, 2022, which in turn claims priority to Japanese Patent Application No. 2021-144889, filed on Sep. 6, 2021, and the entire contents of each of which Applications are hereby incorporated by reference.

TECHNICAL FIELD

The present invention relates to a thermoplastic resin pellet and a method for manufacturing a thermoplastic resin pellet.

BACKGROUND ART

A thermoplastic resin is a resin that softens when the temperature thereof reaches the glass transition temperature or the melting point thereof, and it is roughly classified into a general-purpose plastic and an engineering plastic.

Among the above, engineering plastic has excellent mechanical properties and heat resistance, and thus it is widely used as a molding material for various components such as a mechanical component, a home electric appliance component, a communication equipment component, an OA component, an automobile component, or an article for leisure. Among the above, the thermoplastic resin is used in various use applications by utilizing characteristics thereof such as transparency and impact resistance. As the molding material, a resin composition containing a thermoplastic resin is used. For example, this resin composition is subjected to melt kneading by using an extruder and extruded from a strand die to form a strand, and then the strand is cut into a predetermined shape with a pelletizer, thereby being molded and processed into pellets.

In recent years, in producing of an injection-molded article using thermoplastic resin pellets, there is case where continuous molding is carried out for a long period of time under injection molding conditions in which the molding cycle is shortened to improve productivity. In such continuous molding of thermoplastic resins, it is important that the stability of the metering time (also referred to as plasticization time) during injection molding is high. When the metering time during molding varies, there is a problem that the productivity decreases.

To solve such a problem, Patent Document 1 describes a pellet from which burrs have been removed in order to stabilize a metering time during molding of a molded article.

CITATION LIST

Patent Document

[Patent Document 1]

Japanese Unexamined Patent Application, First Publication No. 2013-177007

SUMMARY OF INVENTION

Technical Problem

However, for the thermoplastic resin pellets, there has been a demand for further improvement in the metering stability during molding in order to shorten the production time.

In the present specification, the "metering stability" is evaluated by the metering time during molding. That is, the phrase "metering stability is favorable" means that the average value of the total of the metering times of the pellets is short when a plurality of pellets are molded a predetermined number of times.

The present invention has been made in consideration of the above circumstances, and an object of the present invention is to provide a thermoplastic resin pellet having favorable metering stability at the time of producing a molded article.

Solution to Problem

In order to achieve the above-described object, the present invention employs the following configurations.

[1] A thermoplastic resin pellet containing:

a thermoplastic resin (A); and a fibrous filler (B), in which a length-weighted average fiber length of the fibrous filler (B) is 5 mm or more and less than 50 mm, a pellet length of the thermoplastic resin pellet and the length-weighted average fiber length of the fibrous filler (B) are substantially the same, and a maximum cross-sectional height Rt of a surface of the thermoplastic resin pellet is less than 120 μm.

[2] The thermoplastic resin pellet according to [1], in which the thermoplastic resin (A) is a liquid crystal polyester resin.

[3] The thermoplastic resin pellet according to [1] or [2], in which the fibrous filler (B) includes a carbon fiber or a glass fiber.

[4] The thermoplastic resin pellet according to any one of [1] to [3], in which an arithmetic average roughness Ra of a surface of the thermoplastic resin pellet is 11 μm or less.

[5] A method for producing the thermoplastic resin pellet according to any one of [1] to [4], the method including:

a step of impregnating a fiber bundle which is a raw material of the fibrous filler (B), with the thermoplastic resin (A) in a melted state to obtain a strand-shaped resin structural body, a step of rolling the strand-shaped resin structural body so that a maximum cross-sectional height Rt can be less than 120 μm; and a step of cutting the rolled resin structural body to be pelletized.

Advantageous Effects of Invention

According to the present invention, it is possible to provide a thermoplastic resin pellet having favorable metering stability at the time of producing a molded article.

DESCRIPTION OF EMBODIMENTS (Thermoplastic Resin Pellet)

A thermoplastic resin pellet according to the present embodiment contains a thermoplastic resin (A) and a fibrous filler (B).

The length-weighted average fiber length of the fibrous filler (B) is 5 mm or more and less than 50 mm, and the pellet length of the thermoplastic resin pellet and the length-weighted average fiber length of the fibrous filler (B) are substantially the same.

The maximum cross-sectional height Rt of the surface of the thermoplastic resin pellet is less than 120 μm.

In the present specification, the phrase "the pellet length of the thermoplastic resin pellet and the length-weighted average fiber length of the fibrous filler (B) are substantially the same" means that the length-weighted average fiber length of the fibrous filler (B) arranged in the resin pellet is 95% to 105% of the length of the resin pellet in the longitudinal direction.

Because the thermoplastic resin pellet according to the present embodiment are typically produced according to a production method described later, the pellet length of the thermoplastic resin pellet and the length-weighted average fiber length of the fibrous filler (B) are to be substantially the same.

The shape of the thermoplastic resin pellet according to the present embodiment is preferably a shape of an elliptical column or a flat elliptical column.

Figure 1:
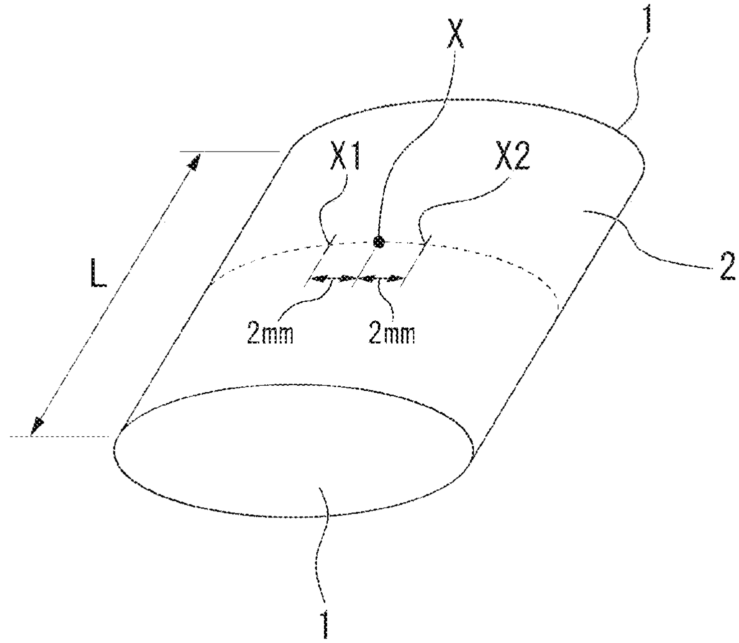
FIG. 1 is a schematic view showing an example of a thermoplastic resin pellet according to the present embodiment.

FIG. 1 is a schematic view showing a thermoplastic resin pellet 1P which is an example of the thermoplastic resin pellet according to the present embodiment.

The thermoplastic resin pellet 1P is a flat elliptical column-shaped pellet and has an end surface 1 and an outer circumferential surface 2.

The pellet length L of the thermoplastic resin pellet 1P means the length of the thermoplastic resin pellet 1P (the distance between both end surfaces 1) in the longitudinal direction.

In the present specification, the term "the surface of the thermoplastic resin pellet" means an outer circumferential surface 2 of the thermoplastic resin pellet 1P.

Specifically, as described later, the thermoplastic resin pellet according to the present embodiment is obtained by extruding, in a strand shape, a resin structural body containing the thermoplastic resin (A) and the fibrous filler (B) by using an extruder, and cutting the resin structural body to a predetermined length in the longitudinal direction to be pelletized. In the corresponding step, a cut surface generated when the strand-shaped resin structural body is cut to a predetermined length in the longitudinal direction is "the end surface of the thermoplastic resin pellet". In addition, the surface in contact with the extrusion port is "the surface of the thermoplastic resin pellet". In addition, the term "the surface of the thermoplastic resin pellet" is a surface other than "the end surface of the thermoplastic resin pellet".

The maximum cross-sectional height Rt of the surface (that is, the outer circumferential surface 2 of the thermoplastic resin pellet 1P) of the thermoplastic resin pellet according to the present embodiment is less than 120 μm, and it is preferably 118 μm or less, more preferably 116 μm or less, and still more preferably 115 μm or less.

When the maximum cross-sectional height Rt of the surface of the thermoplastic resin pellet according to the present embodiment is less than 120 μm, the metering stability is improved when a molded article is produced by using the thermoplastic resin pellet according to the present embodiment. In addition, when it is equal to or smaller than the preferred value described above, the metering stability is further improved.

The arithmetic average roughness Ra of the surface of the thermoplastic resin pellet according to the present embodiment is preferably 11 μm or less.

When the arithmetic average roughness Ra of the surface of the thermoplastic resin pellet according to the present embodiment is 11 μm or less, the metering stability is further improved when a molded article is produced by using the thermoplastic resin pellet according to the present embodiment.

The maximum average roughness Rz of the surface of the thermoplastic resin pellet according to the present embodiment is, for example, preferably 100 μm or less, more preferably 80 μm or less, and still more preferably 60 μm or less.

When the maximum average roughness Rz of the surface of the thermoplastic resin pellet according to the present embodiment is equal to or smaller than the preferred value described above, the metering stability is further improved when a molded article is produced by using the thermoplastic resin pellet according to the present embodiment.

The maximum peak height Rp on the surface of the thermoplastic resin pellet according to the present embodiment is, for example, preferably 80 μm or less, more preferably 60 μm or less, and still more preferably 40 μm or less.

When the maximum peak height Rp of the surface of the thermoplastic resin pellet according to the present embodiment is equal to or smaller than the preferred value described above, the metering stability is further improved when a molded article is produced by using the thermoplastic resin pellet according to the present embodiment.

The maximum valley depth Rv of the surface of the thermoplastic resin pellet according to the present embodiment is, for example, preferably 70 μm or less, more preferably 50 μm or less, and still more preferably 30 μm or less.

When the maximum valley depth Rv of the surface of the thermoplastic resin pellet according to the present embodiment is equal to or smaller than the preferred value described above, the metering stability is further improved when a molded article is produced by using the thermoplastic resin pellet according to the present embodiment.

The root mean square height Rq of the surface of the thermoplastic resin pellet according to the present embodiment is, for example, preferably 80 μm or less, more preferably 60 μm or less, and still more preferably 40 μm or less.

When the root mean square height Rq of the surface of the thermoplastic resin pellet according to the present embodiment is equal to or smaller than the preferred value described above, the metering stability is further improved when a molded article is produced by using the thermoplastic resin pellet according to the present embodiment.

In the thermoplastic resin pellet according to the present embodiment, it is preferable that the maximum cross-sectional height Rt and the arithmetic average roughness Ra of the surface of the pellet are equal to or smaller than the preferred values described above, it is more preferable that the maximum cross-sectional height Rt and the arithmetic average roughness Ra of the surface of the pellet are equal to or smaller than the preferred values described above, and the maximum average roughness Rz, the maximum peak height Rp, the maximum valley depth Rv, or the root mean square height Rq is equal to or smaller than the preferred value described above, and it is still more preferable that all of the maximum cross-sectional height Rt, the arithmetic average roughness Ra, the maximum average roughness Rz, the maximum peak height Rp, the maximum valley depth Rv, and the root mean square height Rq of the surface of the pellet are equal to or smaller than the preferred values described above.

[Method for Measuring Maximum Cross-Sectional Height Rt, Arithmetic Average Roughness Ra, Maximum Average Roughness Rz, Maximum Peak Height Rp, Maximum Valley Depth Rv, and Root Mean Square Height Rq]

The maximum cross-sectional height Rt, the arithmetic average roughness Ra, the maximum average roughness Rz, the maximum peak height Rp, the maximum valley depth Rv, and the root mean square height Rq of the surface of the thermoplastic resin pellet according to the present embodiment can be measured according to the following method using a surface roughness meter (SE600LK-31, manufactured by Kosaka Laboratory Ltd.).

Procedure (1): A resin pellet is placed on a measurement table so that the end surface of the resin pellet is perpendicular to the measurement table, and the resin pellet and the measurement table are adhered to each other with a double-sided tape so that the resin pellet does not move.

Procedure (2): The locus of the measuring needle is set to be perpendicular to the length direction from a point which is at half the length (the pellet length) of the resin pellet in the longitudinal direction. Then, from the center point X which is at half the length (the pellet length) of the resin pellet in the longitudinal direction, a range of ±2 mm (a total of 4 mm from X1 to X2) in the longitudinal direction and the vertical direction is set as a measurement range as shown in FIG. 1.

Procedure (3): Under the measurement conditions shown below, five resin pellets are randomly taken out from the plurality of resin pellets, and the front side and the back side of each of the taken-out five resin pellets are each subjected to one measurement, whereby a total of ten times of measurements is carried out.

Procedure (4): The reference height is calibrated using a standard piece for surface property measurement SS-N21, a displacement y is determined from the reference height, the maximum cross-sectional height Rt, the arithmetic average roughness Ra, the maximum average roughness Rz, the maximum peak height Rp, the maximum valley depth Rv, and the root mean square height Rq of the surface of the resin pellet are calculated according to Expression (1) to (6) shown below, and the average values of the values obtained from the total of ten times of the procedure (3) are defined as the arithmetic average roughness Ra, the maximum average roughness Rz, the maximum peak height Rp, the maximum valley depth Rv, and the root mean square height Rq of the thermoplastic resin pellet.

| <Measurement conditions> |
| --- |
| Measurement magnification: 100 times<br>Feed rate: 0.5 mm/s<br>Trace length: 1.6 mm<br>Cutoff: λc = 0.8 mm<br>Evaluation length: Cutoff × 5<br>Pre-length: 0 mm<br>Filter characteristic: Gaussian<br>Leveling processing: Straight line (entire area)<br>Detector: Contact PUDJ2S |

$$\text{Maximum cross-sectional height } R_t = \max R_p + \max R_v \tag{1}$$

$$\text{Arithmetic average roughness } R_a = \frac{1}{n}\sum_{i=1}^{n}|y_i| \tag{2}$$

$$\text{Maximum average roughness } R_z = R_p + R_v \tag{3}$$

$$\text{Maximum peak height } R_p = \max_i y_i \tag{4}$$

$$\text{Maximum valley depth } R_v = \min_i |y_i| \tag{5}$$

$$\text{Root mean square height } R_q = \sqrt{\frac{1}{n}\sum_{i=1}^{n} y_i^2} \tag{6}$$

The maximum cross-sectional height Rt, the arithmetic average roughness Ra, the maximum average roughness Rz, the maximum peak height Rp, the maximum valley depth Rv, and the root mean square height Rq of the surface of the thermoplastic resin pellet according to the present embodiment can be adjusted by appropriately changing the kind of the thermoplastic resin (A), the kind or content of the fibrous filler (B), the conditions for a step of processing a resin structural body in a method for producing a thermoplastic resin pellet according to the present embodiment described below, and the like.

In addition, particularly when a liquid crystal polyester resin having a low melt viscosity is used as the thermoplastic resin (A), the maximum cross-sectional height Rt and the like are easily controlled.

In the thermoplastic resin pellet according to the present embodiment, the lower limit value of the ratio D1/D2 of the major axis D1 to the minor axis D2 of the cross section of the thermoplastic resin pellets is preferably 2.0 or more, more preferably 2.5 or more, and still more preferably 2.8 or more.

The upper limit value of D1/D2 is preferably 100 or less, more preferably 80 or less, still more preferably 50 or less, particularly preferably 20 or less, and most preferably 15 or less.

For example, D1/D2 of the cross section of the thermoplastic resin pellet according to the present embodiment is preferably 2.0 or more and 100 or less, more preferably 2.5 or more and 80 or less, still more preferably 2.8 or more and 50 or less, particularly preferably 2.8 or more and 20 or less, and most preferably 2.8 or more and 15 or less.

When D1/D2 of the cross section of the thermoplastic resin pellet according to the present embodiment is within the preferred range described above, the metering stability is further improved when a molded article is produced by using the thermoplastic resin pellet according to the present embodiment.

The lower limit value of the major axis D1 of the cross section of the thermoplastic resin pellet according to the present embodiment is preferably 1 mm or more, more preferably 1.5 mm or more, still more preferably 2 mm or more, and particularly preferably 4.1 mm or more.

The upper limit value of the major axis D1 of the cross section of the thermoplastic resin pellet according to the present embodiment is preferably 24 mm or less, more preferably 20 mm or less, still more preferably 15 mm or less, and particularly preferably 12 mm or less.

For example, the major axis D1 of the cross section of the thermoplastic resin pellet according to the present embodiment is preferably 1 mm or more and 24 mm or less, more preferably 1.5 mm or more and 20 mm or less, still more preferably 2 mm or more and 15 mm or less, and particularly preferably 4.1 mm or more and 12 mm or less, and it may be 4.1 mm or more and 24 mm or less.

The lower limit value of the minor axis D2 of the cross section of the thermoplastic resin pellet according to the present embodiment is preferably 0.1 mm or more, more preferably 0.15 mm or more, still more preferably 0.2 mm or more, and particularly preferably 0.25 mm or more.

The upper limit value of the minor axis D2 of the cross section of the thermoplastic resin pellet according to the present embodiment is preferably 5 mm or less, more preferably 3 mm or less, still more preferably 2.5 mm or less, and particularly preferably 1.4 mm or less.

For example, the minor axis D2 of the cross section of the thermoplastic resin pellet according to the present embodiment is preferably 0.1 mm or more and 5 mm or less, more preferably 0.15 mm or more and 3 mm or less, still more preferably 0.2 mm or more and 2.5 mm or less, and particularly preferably 0.25 mm or more and 1.4 mm or less.

In the thermoplastic resin pellet according to the present embodiment, the major axis D1 of the cross section of the thermoplastic resin pellet is preferably 1 mm or more and 24 mm or less, more preferably 1.5 mm or more and 20 mm or less, still more preferably 2 mm or more and 15 mm or less, and particularly preferably 4.1 mm or more and 12 mm or less, and it may be 4.1 mm or more and 24 mm or less, the minor axis D2 of the cross section of the thermoplastic resin pellet is preferably 0.1 mm or more and 5 mm or less, more preferably 0.15 mm or more and 3 mm or less, still more preferably 0.2 mm or more and 2.5 mm or less, and particularly preferably 0.25 mm or more and 1.4 mm or less, and D1/D2 of the cross section of the thermoplastic resin pellet is 2.0 or more and 100 or less, and it is preferably 2.5 or more and 80 or less, more preferably 2.8 or more and 50 or less, still more preferably 2.8 or more and 20 or less, and particularly preferably 2.8 or more and 15 or less.

When the major axis D1 and the minor axis D2 of the cross section of the thermoplastic resin pellet according to the present embodiment are within the preferred range described above, and D1/D2 is within the range described above, the metering stability is further improved when a molded article is produced by using the thermoplastic resin pellet according to the present embodiment.

In the present specification, the term "the cross section of the thermoplastic resin pellet" means a cross section (polished surface) that is generated by polishing "the end surface of the thermoplastic resin pellet" described above to a length of ½ of the pellet length of the thermoplastic resin pellet according to procedures (iii) and (iv) in [Method for measuring major axis D1 and minor axis D2 of cross section of thermoplastic resin pellet], which will be described later.

In the present specification, the major axis D1 and the minor axis D2 of the cross section of the thermoplastic resin pellet each mean a Feret's diameter (projection width) and can be measured according to the following method.

[Measurement of Major Axis D1 and Minor Axis D2 of Cross Section of Resin Pellet]

Figure 2:
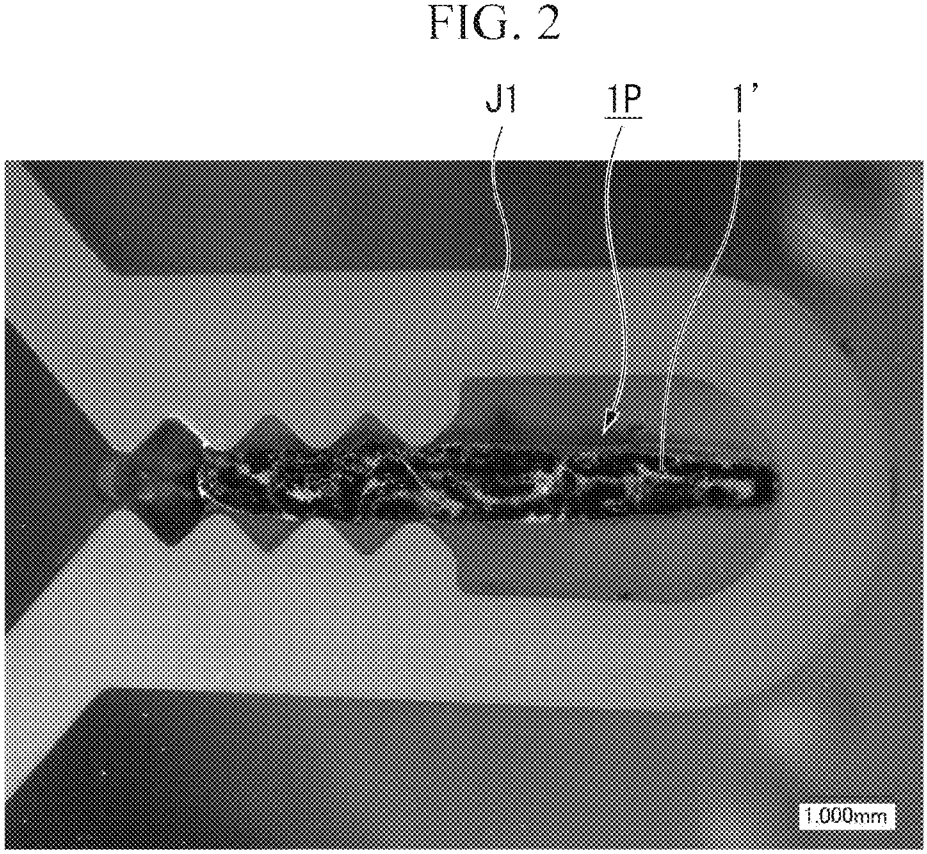
FIG. 2 is a microscopic image of a cross section of the thermoplastic resin pellet according to the present embodiment.

Procedure (i): The thermoplastic resin pellet 1P is placed in a columnar mold that is sufficiently larger than the thermoplastic resin pellet 1P, and using a fixing jig J1 (Holding blue clips (plastic), manufactured by PRESI Co., Ltd.) as shown in FIG. 2, the thermoplastic resin pellet 1P is erected to be fixed so that the length direction thereof is perpendicular to the bottom surface of the mold.

Procedure (ii): A solution obtained by adding a Cold-Mounting Resin No. 105 (manufactured by Struers) and an M agent (curing agent) for the No. 105 (manufactured by Struers) at a ratio of 100:2 is poured into the columnar mold. Next, it is allowed to stand at room temperature (23° C.) for 1 day or longer to be sufficiently solidified.

Procedure (iii): The solidified columnar sample is taken out from the mold, and using a polishing machine (APO-128, Automax Polisher EV, manufactured by Refine Tec Ltd.), the solidified columnar sample is polished so that the pellet length of the thermoplastic resin pellet 1P can be a length of ½ of the length thereof.

Procedure (iv): A suede cloth No. 52-308 (manufactured by Refine Tec Ltd.) is spread for the polishing machine, and the surface polished to a length of ½ is polished with water containing an alumina powder (Alumina Powder A, manufactured by Refine Tec Ltd.) until the surface is flat and polishing scratches disappear. In this way, a cross section 1' of the resin pellets is formed.

Procedure (v): The cross section 1' of the resin pellets is imaged using a microscope (main body: VHX-8000, lens: VH-ZOOR, manufactured by KEYENCE CORPORATION) at a magnification of 10 to 25 times.

Figure 3:
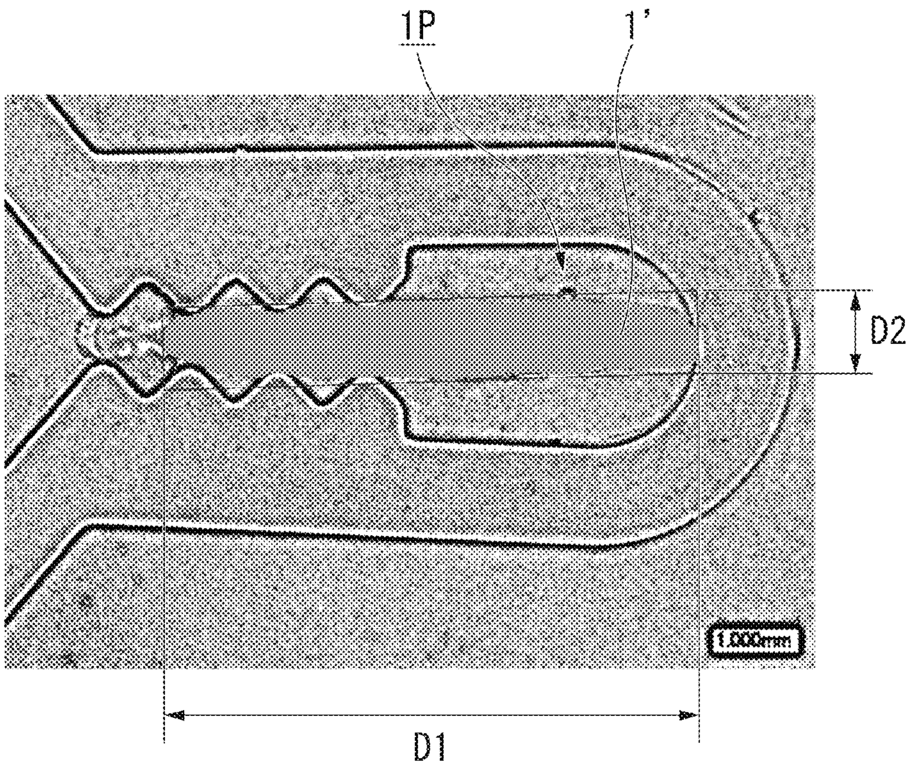
FIG. 3 is a view in which a major axis D1 and a minor axis D2 of a cross section of the thermoplastic resin pellet according to the present embodiment are measured by image analysis software.

Procedure (vi): As shown in FIG. 3, the captured image is subjected to binarization processing with image processing software (WinRooF2018, manufactured by MITANI CORPORATION), the Feret's diameter is calculated using Feret II from the measurement tool, and the Feret horizontal is defined as the major axis D1 of the cross section of the thermoplastic resin pellet 1P, and the Feret vertical is defined as the minor axis D2 of the cross section of the thermoplastic resin pellet 1P.

Procedure (vii): Five resin pellets are subjected to the procedures (i) to (vi), and the average values obtained from five times of measurements are adopted as the values of the major axis D1 and the minor axis D2 of the resin pellet.

In the present measurement, for the major axis D1 and the minor axis D2 described above, the major axis D1 and the minor axis D2 are calculated not for the end surface 1 of the resin pellet but for the cross section 1' of the resin pellet. In general, the major axis D1 and the minor axis D2 of the end surface 1 of the resin pellets and the major axis D1 and the minor axis D2 of the cross section 1' of the resin pellet are almost the same diameters. However, in order to further reduce the influence of variations in producing, the major axis D1 and the minor axis D2 of the cross section 1' of the resin pellets are adopted.

<Thermoplastic Resin>

Examples of the thermoplastic resin (A) contained in the thermoplastic resin pellet according to the present embodiment include polyolefin resins such as polyethylene, polypropylene, polybutadiene, and polymethylpentene; vinyl-based resins such as vinyl chloride, vinylidene chloride vinyl acetate, and polyvinyl alcohol;

polystyrene-based resins such as polystyrene, an acrylonitrile-styrene resin (AS resin), and an acrylonitrile-butadiene-styrene resin (ABS resin); polyamide-based resins such as polyamide 6 (nylon 6), polyamide 66 (nylon 66), polyamide 11 (nylon 11), polyamide 12 (nylon 12), polyamide 46 (nylon 46), polyamide 610 (nylon 610), polytetramethylene terephthalamide (nylon 4T), polyhexamethylene terephthalamide (nylon 6T), polymetaxylylene adipamide (nylon MXD6), polynonamethylene terephthalamide (nylon 9T), and polydecamethylene terephthalamide (nylon 10T); polyester-based resins such as polyethylene terephthalate, polyethylene naphthalate, polybutylene terephthalate, and polytrimethylene terephthalate; polysulfone-based resins such as modified polysulfone, polyethersulfone, polysulfone, and polyphenylsulfone; polyphenylene sulfides such as a linear polyphenylene sulfide, a cross-linked polyphenylene sulfide, and a semi-cross-linked polyphenylene sulfide; polyether ketones such as polyetherketone, polyetheretherketone, and polyether ketoneketone; polycarbonate; polyphenylene ether; and polyimide-based resins such as a thermoplastic polyimide, polyamide-imide, and polyetherimide.

Among the above, the thermoplastic resin (A) contained in the thermoplastic resin pellet according to the present embodiment is preferably a liquid crystal polyester resin from the viewpoint of easily producing a thermoplastic resin pellet in which the maximum cross-sectional height Rt of the surface of the thermoplastic resin pellet is less than 120 μm as shown in a method for producing a thermoplastic resin pellet, which will be described later.

<<Liquid Crystal Polyester Resin>>

The liquid crystal polyester resin is not particularly limited as long as it is a polyester resin that exhibits liquid crystallinity in a melted state. The liquid crystal polyester resin according to the present embodiment may be a liquid crystal polyester amide, a liquid crystal polyester ether, a liquid crystal polyester carbonate, a liquid crystal polyester imide, or the like.

The flow starting temperature of the liquid crystal polyester resin according to the present embodiment is preferably 250° C. or higher, more preferably 270° C. or higher, and still more preferably 280° C. or higher.

In addition, the flow starting temperature of the liquid crystal polyester resin according to the present embodiment is preferably 400° C. or lower, more preferably 360° C. or lower, and still more preferably 330° C. or lower.

For example, the flow starting temperature of the liquid crystal polyester resin according to the present embodiment is preferably 250° C. or higher and 400° C. or lower, more preferably 270° C. or higher and 360° C. or lower, and still more preferably 280° C. or higher and 330° C. or lower.

In the present specification, the flow starting temperature is also referred to as a flow temperature, and it is a temperature that serves as an indication for the molecular weight of the liquid crystal polyester resin (see "Liquid Crystal Polymer,-Synthesis, Molding, and Application-", edited by Naoyuki Koide, CMC Publishing Co., Ltd., Jun. 5, 1987; p. 95).

The flow starting temperature is a temperature at which a viscosity of 4,800 Pa's (48,000 poises) is exhibited, in a case of using a method of measuring the flow starting temperature, in which specifically, a capillary rheometer is used, and the liquid crystal polyester resin (A) is melted while raising the temperature at a rate of 4° C./min under a load of 9.8 MPa (100 kg/cm$^2$) and pushed out from a nozzle having an inner diameter of 1 mm and a length of 10 mm.

It is preferable that the liquid crystal polyester resin according to the present embodiment is a fully aromatic liquid crystal polyester that is obtained in a case of using only an aromatic compound as a raw material monomer.

Typical examples of the liquid crystal polyester resin according to the present embodiment include a liquid crystal polyester resin obtained by polymerization (polycondensation) of an aromatic hydroxycarboxylic acid, an aromatic dicarboxylic acid, and at least one compound selected from the group consisting of an aromatic diol, an aromatic hydroxyamine, and an aromatic diamine; a liquid crystal polyester resin obtained by polymerization of a plurality of kinds of aromatic hydroxycarboxylic acids; a liquid crystal polyester resin obtained by polymerization of an aromatic dicarboxylic acid and at least one compound selected from the group consisting of an aromatic diol, an aromatic hydroxyamine, and an aromatic diamine; and a liquid crystal polyester resin obtained by polymerization of a polyester such as polyethylene terephthalate, and an aromatic hydroxycarboxylic acid.

Here, the aromatic hydroxycarboxylic acid, the aromatic dicarboxylic acid, the aromatic diol, the aromatic hydroxyamine, and the aromatic diamine may be each independently so that a part or whole thereof can be replaced with a polymerizable derivative thereof, thereby being used.

Examples of the polymerizable derivatives of compounds having a carboxyl group, such as an aromatic hydroxycarboxylic acid and an aromatic dicarboxylic acid, include esters obtained by converting a carboxyl group to an alkoxycarbonyl group or an aryloxycarbonyl group; acid halides obtained by converting a carboxyl group to a haloformyl group; and acid anhydrides obtained by converting a carboxyl group to an acyloxycarbonyl group.

Examples of the polymerizable derivatives of compounds having a hydroxyl group, such as an aromatic hydroxycarboxylic acid, an aromatic diol, and an aromatic hydroxyamine, include acylated substances obtained by acylating a hydroxyl group to be converted to an acyloxyl group.

Examples of the polymerizable derivatives of compounds having an amino group, such as an aromatic hydroxyamine and an aromatic diamine, include acylated substances obtained by acylating an amino group to be converted to an acylamino group.

The liquid crystal polyester resin according to the present embodiment preferably has a repeating unit represented by Formula (1) (hereinafter, also referred to as "repeating unit (1)"), and it more preferably has the repeating unit (1), a repeating unit represented by Formula (2) (hereinafter, also referred to as "repeating unit (2)"), and a repeating unit represented by Formula (3) (hereinafter, also referred to as "repeating unit (3)").

$$\text{—O—Ar}^1\text{—CO—} \qquad (1)$$

$$\text{—CO—Ar}^2\text{—CO—} \qquad (2)$$

$$\text{—X—Ar}^3\text{—Y—} \qquad (3)$$

[In the formula, Ar$^1$ represents a phenylene group, a naphthylene group, or a biphenylylene group. Ar$^2$ and Ar$^3$ each independently represent a phenylene group, a naphthylene group, a biphenylylene group, or a group represented by the following formula (4). X and Y each independently represent an oxygen atom or an imino group $$(\text{—NH—}).$$

Hydrogen atoms that are present in the group represented by $Ar^1$, $Ar^2$, or $Ar^3$ may be each independently substituted with a halogen atom, an alkyl group, or an aryl group.]

$$—Ar^4—Z—Ar^5— \quad (4)$$

[In the formula, $Ar^4$ and $Ar^5$ each independently represent a phenylene group or a naphthylene group. Z represents an oxygen atom, a sulfur atom, a carbonyl group, a sulfonyl group, or an alkylidene group.]

Examples of the halogen atom that is capable of being substituted for one or more hydrogen atoms in the group represented by $Ar^1$, $Ar^2$, or $Ar^3$ include a fluorine atom, a chlorine atom, a bromine atom, and an iodine atom.

Examples of the alkyl group that is capable of being substituted for one or more hydrogen atoms in the group represented by $Ar^1$, $Ar^2$, or $Ar^3$ include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group, where the number of carbon atoms of the alkyl group is preferably 1 to 10.

Examples of the aryl group that is capable of being substituted for one or more hydrogen atoms in the group represented by $Ar^1$, $Ar^2$, or $Ar^3$ include a phenyl group, an o-tolyl group, an m-tolyl group, a p-tolyl group, a 1-naphthyl group, and a 2-naphthyl group, where the number of carbon atoms of the aryl group is preferably 6 to 20. When the hydrogen atoms in the group represented by $Ar^1$, $Ar^2$, or $Ar^3$ are substituted with the group described above, the number of substitutions is preferably one or two and more preferably one.

Examples of the alkylidene group as Z in Formula (4) include a methylene group, an ethylidene group, an isopropylidene group, an n-butylidene group, and a 2-ethylhexylidene group, where the number of carbon atoms thereof is preferably 1 to 10.

The repeating unit (1) is a repeating unit derived from a predetermined aromatic hydroxycarboxylic acid. The repeating unit (1) is preferably a repeating unit in which $Ar^1$ is a 1,4-phenylene group (a repeating unit derived from p-hydroxybenzoic acid) and a repeating unit in which $Ar^1$ is a 2,6-naphthylene group (a repeating unit derived from 6-hydroxy-2-naphthoic acid).

In the present specification, the term "derived" means that a chemical structure of a functional group that contributes to polymerization changes due to the polymerization of the raw material monomer, and no other structural change occurs.

The repeating unit (2) is a repeating unit derived from a predetermined aromatic dicarboxylic acid. The repeating unit (2) is preferably a repeating unit in which $Ar^2$ is a 1,4-phenylene group (a repeating unit derived from terephthalic acid), a repeating unit in which $Ar^2$ is a 1,3-phenylene group (a repeating unit derived from isophthalic acid), a repeating unit in which $Ar^2$ is a 2,6-naphthylene group (a repeating unit derived from 2,6-naphthalenedicarboxylic acid), and a repeating unit in which $Ar^2$ is a diphenylether-4,4'-diyl group (a repeating unit derived from a diphenylether-4,4'-dicarboxylic acid), and it is more preferably a repeating unit in which $Ar^2$ is a 1,4-phenylene group, a repeating unit in which $Ar^2$ is a 1,3-phenylene group, and a repeating unit in which $Ar^2$ is a 2,6 -naphthylene group.

The repeating unit (3) is a repeating unit derived from a predetermined aromatic diol, aromatic hydroxylamine, or aromatic diamine. The repeating unit (3) is preferably a repeating unit in which $Ar^3$ is a 1,4-phenylene group (a repeating unit derived from hydroquinone, p-aminophenol, or p-phenylenediamine) and a repeating unit in which $Ar^3$ is a 4,4'-biphenylylene group (a repeating unit derived from 4,4'-dihydroxybiphenyl, 4-amino-4'-hydroxybiphenyl, or 4,4'-diaminobiphenyl).

The number of the repeating units (1) is preferably 30% or more and 80% or less, more preferably 40% or more and 70% or less, and still more preferably 45% or more and 70% or less, with respect to the total number (100%) of all the repeating units.

The number of the repeating units (2) is preferably 35% or less, more preferably 10% or more and 35% or less, and still more preferably 15% or more and 30% or less, with respect to the total number (100%) of all the repeating units.

The number of the repeating units (3) is preferably 35% or less, more preferably 10% or more and 35% or less, and still more preferably 15% or more and 30% or less, with respect to the total number (100%) of all the repeating units.

The ratio of the number of the repeating units (2) to the number of the repeating units (3), which is represented by [the number of the repeating units (2)]/[the number of the repeating units (3)], is preferably 0.9/1 to 1/0.9, more preferably 0.95/1 to 1/0.95, and still more preferably 0.98/1 to 1/0.98.

The liquid crystal polyester resin according to the present embodiment may have two or more kinds of each of repeating units (1) to (3). In addition, the liquid crystal polyester resin may have a repeating unit other than the repeating units (1) to (3); however, the number thereof is preferably 10% or less and more preferably 5% or less with respect to the total number (100%) of all the repeating units.

In the present specification, the number of each of repeating units (the degree of polymerization of each of repeating units) means a value that is determined according to the analysis method described in Japanese Unexamined Patent Application, First Publication No. 2000-19168.

Specifically, the liquid crystal polyester resin (A) is reacted with a lower alcohol (alcohol having 1 to 3 carbon atoms) in a supercritical state to depolymerize the liquid crystal polyester resin (A) to monomers from which the repeating units thereof are derived, and the monomer from which each of the repeating units obtained as the depolymerization product is derived is quantified by liquid chromatography, whereby the number of each of the repeating units can be calculated.

For example, when the liquid crystal polyester resin consists of the repeating units (1) to (3), the number of the repeating units (1) can be calculated by calculating, by liquid chromatography, the molar concentration of the monomer from which each of the repeating units (1) to (3) are derived, and calculating the ratio of the molar concentration of the monomer from which the repeating unit (1) is derived, when the total of the molar concentrations of the monomers from which the repeating units (1) to (3) are each derived is set to 100%.

The liquid crystal polyester resin according to the present embodiment is preferable to have, as the repeating unit (3), a repeating unit in which X and Y are each an oxygen atom, that is, preferable to have a repeating unit derived from a predetermined aromatic diol, since the melt viscosity is easily decreased. It is more preferable to have only a repeating unit in which X and Y are each an oxygen atom, as the repeating unit (3).

One kind of the thermoplastic resin (A) according to the present invention may be used alone, or two or more kinds thereof may be used in combination.

The content of the liquid crystal polyester resin in the thermoplastic resin (A) according to the present embodiment is preferably 80% by mass or more, more preferably 90% by mass or more, and still more preferably 95% by mass or more, with respect to 100% by mass of the total amount of the thermoplastic resin (A), and it may be 100% by mass, that is, the thermoplastic resin (A) according to the present embodiment may consist of only the liquid crystal polyester resin.

When the content of the liquid crystal polyester resin in the thermoplastic resin (A) according to the present embodiment is equal to or higher than the preferred value described above, it is easier to produce a thermoplastic resin pellet in which the maximum cross-sectional height Rt of the surface of the thermoplastic resin pellet is less than 120 μm.

The content of the thermoplastic resin (A) is preferably 40% by mass or more, more preferably 45% by mass or more, and still more preferably 50% by mass or more, with respect to 100% by mass of the total amount of the thermoplastic resin pellets.

In addition, the content of the thermoplastic resin (A) is preferably 90% by mass or less, more preferably 85% by mass or less, and still more preferably 80% by mass or less, with respect to 100% by mass of the total amount of the thermoplastic resin pellets.

For example, the content of the thermoplastic resin (A) is preferably 40% by mass or more and 90% by mass or less, more preferably 45% by mass or more and 85% by mass or less, and still more preferably 50% by mass or more and 80% by mass or less, with respect to 100% by mass of the total amount of the thermoplastic resin pellets.

<Fibrous Filler (B)>

The fibrous filler (B) contained in the thermoplastic resin pellet according to the present embodiment has a length-weighted average fiber length of 5 mm or more and less than 50 mm.

In the present specification, the "length-weighted average fiber length" in the thermoplastic resin pellet can be measured according to the following method.

[Measurement of Length-Weighted Average Fiber Length of Fibrous Filler (B) in Resin Pellet]

The length-weighted average fiber length of the fibrous filler in the resin pellets can be measured according to the following method.

Procedure (1): 5 g of resin pellets are heated in a muffle furnace to remove a resin content.

Regarding the heating conditions, in a case of carbon fibers, the carbon fibers are heated at 500° C. for 3 hours, and in a case of glass fibers, the glass fibers are heated at 600° C. for 4 hours.

Procedure (2): The resin content is removed from the resin pellets to obtain only the fibrous filler, which is subsequently dispersed in 1,000 mL of an aqueous solution containing 0.05% by volume of a surfactant (Micro 90, manufactured by INTERNATIONAL PRODUCTS CORPORATION) to prepare a fibrous filler dispersion liquid.

Procedure (3): 100 mL is extracted from the fibrous filler dispersion liquid and diluted to 10 times with pure water. 50 mL is extracted from the dispersion liquid after dilution and dispersed in a petri dish. Subsequently, the fibrous filler dispersed in the petri dish is observed with a microscope (main body: VHX-8000, lens: VH-ZOOR, manufactured by KEYENCE CORPORATION, magnification: 10 to 25 times), and five images per sample are captured such that the imaged regions do not overlap. However, when the fibrous filler is carbon fibers, 50 mL is extracted from the dispersion liquid after dilution and then filtered under reduced pressure using a Φ90 mm Kiriyama funnel filter paper (No. 5C), and images of the carbon fibers dispersed on the filter paper are captured.

Procedure (4): The fiber lengths of all of the five captured images are measured using image processing software (Win-ROOF2018, manufactured by MITANI CORPORATION) as follows.

<Method for Measuring Fiber Length>

(a) The captured images are subjected to the monochrome pixel conversion processing.

(b) Binarization processing is carried out so as to color only the imaged fibers.

(c) The fiber length is measured using the needle shape separation function of the image processing software.

(d) The fiber length of the fiber that could not be subjected to the binarization in (c) or the fiber length of the curved fiber is measured according to the multi-point measurement, and the fiber in contact with the edge of the image is not subjected to the measurement. However, in (c) and (d), fibers of 20 μm or less are determined to be noise and not included in the number n of fibers measured. In a case of n>500, that is, when the number n of fibers measured does not exceed 500, the procedure returns to the procedure (3), additional images are captured, and the measurement is carried out until n exceeds 500.

Procedure (5): From the fiber lengths of the fibrous fillers measured in Procedure (4), the length-weighted average fiber length $lm=(\Sigma li^2\}\times ni)/(\Sigma li\times ni)$ is determined ($\Sigma ni>500$).

li: Fiber length of fibrous filler ni: Number of fibrous fillers having fiber length li The length-weighted average fiber length of the fibrous filler (B) is 5 mm or more and less than 50 mm, preferably 5 mm or more and 45 mm or less, and more preferably 5 mm or more and 40 mm or less.

When the length-weighted average fiber length of the fibrous filler (B) is 5 mm or more and less than 50 mm, the metering stability is further improved when a molded article is produced by using the thermoplastic resin pellet according to the present embodiment.

The fibrous filler contained in the thermoplastic resin pellet according to the present embodiment may be a fibrous inorganic filling material or may be a fibrous organic filling material.

Examples of the fibrous inorganic filling material include a glass fiber; a carbon fiber; a ceramic fiber such as a silica fiber, an alumina fiber, or a silica-alumina fiber; a fiber of metal such as iron, gold, copper, aluminum, brass, or stainless steel; a silicon carbide fiber; and a boron fiber.

In addition, examples of the fibrous inorganic filling material include whiskers such as a potassium titanate whisker, a barium titanate whisker, a wollastonite whisker, an aluminum borate whisker, a silicon nitride whisker, and a silicon carbide whisker.

Examples of the fibrous organic filling material include a polyester fiber, a para- or meta-aramid fiber, and a PBO fiber.

The fibrous filler in the present embodiment is preferably, among the above, a glass fiber or a carbon fiber.

Glass Fiber

The kind of the glass fiber is not particularly limited, and known glass fibers can be used. Examples thereof include E-glass (that is, alkali-free glass), C-glass (that is, glass for acid-resistant use applications), AR-glass (that is, glass for alkali-resistant use applications), S-glass, and T-glass.

The glass fiber may be a surface-treated glass fiber or may be a glass fiber that has not been surface-treated.

The glass fiber can be subjected to treatment with a modifier, a silane coupling agent, a boron compound, or the like. Examples of the modifier include an aromatic urethane-based modifier, an aliphatic urethane-based modifier, and an acrylic modifier.

Among the above, E-glass is preferable as the glass fiber.

Carbon Fiber

The kind of the carbon fiber is not particularly limited, and known carbon fibers can be used. For example, it is preferably a PAN-based, pitch-based, rayon-based, phenol-based, or lignin-based carbon fiber, more preferably a PAN-based carbon fiber or a pitch-based carbon fiber, and still more preferably a PAN-based carbon fiber.

In addition, for the intended purpose of imparting conductivity, carbon fibers coated with a metal such as nickel, copper, or ytterbium can also be used.

Examples of the PAN-based carbon fiber include "Zoltek (registered trade name)" manufactured by Zoltek Corporation; "TORAYCA (registered trade name)" manufactured by Toray Industries, Inc.; "PYROFIL (registered trade name)" and "GRAFIL (registered trade name)" manufactured by Mitsubishi Chemical Corporation; "Tenax (registered trade name)" manufactured by TEIJIN LIMITED; "TAIRYFIL (registered trade name)" manufactured by Formosa Plastics Corporation; and "SIGRAFIL (registered trade name)" manufactured by SGL Carbon AG.

The tensile strength of the carbon fiber is preferably 2,500 MPa or more, more preferably 3,500 MPa or more, and still more preferably 4,000 MPa or more.

The fiber breakage during processing up to the production of the molded article is suppressed when carbon fibers having a high tensile strength are used, and it is possible to further improve the mechanical characteristics when the fibers can be left for a long time.

The upper limit value of the tensile strength of the carbon fiber is, for example, 6,000 MPa or less.

The tensile strength of the carbon fiber means a value measured in accordance with JIS R 7606:2000.

The tensile elastic modulus of the carbon fiber is preferably 180 GPa or more, more preferably 200 GPa or more, still more preferably 220 GPa or more, and particularly preferably 240 GPa or more.

In a case of using carbon fibers having a high tensile elastic modulus, it is possible to improve the elastic modulus of the molded article.

The upper limit value of the tensile elastic modulus of the carbon fiber is, for example, 800 GPa or less.

The tensile elastic modulus of the carbon fiber means a value measured in accordance with JIS R 7606:2000.

The tensile elongation of the carbon fiber is preferably 0.4% or more, more preferably 0.6% or more, still more preferably 0.8% or more, and particularly preferably 1.0% or more.

In a case of using carbon fibers having a high tensile elongation, it is possible to improve the tensile elongation of the molded article.

The upper limit value of the tensile elongation of the carbon fiber is, for example, 10% or less.

The tensile elongation of the carbon fiber means a value measured in accordance with JIS R 7606:2000.

The number of fibers of the fibrous filler (B) is preferably 3,000 or more, more preferably 10,000 or more, and still more preferably 30,000 or more.

In addition, the number of fibers of the fibrous filler (B) is preferably 60,000 or less, more preferably 60,000 or less, and still more preferably 55,000 or less.

For example, the number of fibers of the fibrous filler (B) is preferably 3,000 or more and 60,000 or less, more preferably 10,000 or more and 60,000 or less, and still more preferably 30,000 or more and 55,000 or less.

In a method for measuring the number of fibers of the fibrous filler (B) in the resin pellet, the number thereof can be determined by, for example, subjecting one pellet to the removal of the resin content with the same method as in the procedure (1) of [Measurement of length-weighted average fiber length of fibrous filler (B) in resin pellet] described above, taking out one fiber having the same length as the pellet length from the fibrous filler (B), and dividing the total weight of the obtained fibrous filler (B) by the weight of one fiber.

When the number of fibers of the fibrous filler (B) is within the preferred range described above, it is possible to further suppress variations in the physical properties of the molded article that is produced from the thermoplastic resin pellet containing the fibrous filler (B).

The number-average fiber diameter of the fibrous filler (B) is not particularly limited; however, it is preferably 1 to 40 μm and more preferably 3 to 35 μm.

It is preferably 1 to 15 μm, more preferably 3 to 10 μm, and still more preferably 4 to 9 μm when the fibrous filler (B) is carbon fibers.

It is preferably 5 to 35 μm, more preferably 10 to 25 μm, and still more preferably 10 to 20 μm when the fibrous filler (B) is glass fibers.

In a method for measuring the number-average fiber diameter of the fibrous filler (B) in the resin pellet, it is possible to adopt the number-average value of values obtained by, for example, removing the resin content with the same method as in the procedure (1) of [Measurement of length-weighted average fiber length of fibrous filler (B) in resin pellet] described above, observing the obtained fibrous filler (B) under a scanning electron microscope (1,000 times), and measuring the fiber diameters of the 500 fibrous fillers (B) which have been randomly selected.

When the number-average fiber diameter of the fibrous filler (B) is within the preferred range described above, the mechanical strength is efficiently improved by the fibrous filler (B).

The content of the fibrous filler (B) is preferably 10% by mass or more, more preferably 15% by mass or more, and still more preferably 20% by mass or more, with respect to 100% by mass of the total amount of the thermoplastic resin pellets.

In addition, the content of the fibrous filler (B) is preferably 60% by mass or less, more preferably 55% by mass or less, and still more preferably 50% by mass or less, with respect to 100% by mass of the total amount of the thermoplastic resin pellets.

For example, the content of the fibrous filler (B) is preferably 10% by mass or more and 60% by mass or less, more preferably 15% by mass or more and 55% by mass or less, and still more preferably 20% by mass or more and 50% by mass or less, with respect to 100% by mass of the total amount of the thermoplastic resin pellets.

When the content of the fibrous filler (B) is within the preferred range described above, the mechanical strength can be further improved.

The content of the fibrous filler (B) is preferably 10 parts by mass or more, more preferably 20 parts by mass or more, and still more preferably 30 parts by mass or more, with respect to 100 parts by mass of the thermoplastic resin (A).

In addition, the content of the fibrous filler (B) is preferably 150 parts by mass or less, more preferably 90 parts by mass or less, and still more preferably 85 parts by mass or less, with respect to 100 parts by mass of the thermoplastic resin (A).

For example, the content of the fibrous filler (B) is preferably 10 parts by mass or more and 150 parts by mass or less, more preferably 20 parts by mass or more and 90 parts by mass or less, and still more preferably 30 parts by mass or more and 85 parts by mass or less, with respect to 100 parts by mass of the thermoplastic resin (A).

When the content of the fibrous filler (B) with respect to the content of the thermoplastic resin (A) is within the preferred range described above, the metering stability is further improved when a molded article is produced by using the thermoplastic resin pellet according to the present embodiment.

<Other Components>

In addition to the above-described thermoplastic resin (A) and fibrous filler (B), the thermoplastic resin pellet according to the present embodiment may contain, as necessary, one or more of another filler, an additive, and the like other than the fibrous filler (B).

Another Filler

Examples of the other filler other than the fibrous filler (B) include a plate-shaped filler, a spherical filler, a powdery filler, and a deformed filler.

Examples of the plate-shaped filler include talc, mica, graphite, and wollastonite.

The plate-shaped filler may be surface-treated or may be untreated.

Examples of the mica include natural mica such as white mica, gold mica, fluorine gold mica, and tetrasilicon mica, and artificially produced synthetic mica.

Examples of the spherical filler include glass beads and glass balloons.

Examples of the powdery filler include calcium carbonate, dolomite, barium clay sulfate, titanium oxide, carbon black, conductive carbon, and fine-grained silica.

Examples of the deformed filler include a glass flake and a deformed glass fiber.

When the thermoplastic resin pellet according to the present embodiment contains another filler, it preferably contains, among the above, a powdery filler and more preferably contains carbon black.

Examples of the carbon black include acetylene black, thermal black, furnace black, channel black, and Ketjen black. Among them, furnace black is preferable from the viewpoints of the balance between colorability and mechanical characteristics, and the availability, In addition, the carbon black may be carbon black which has been subjected to surface modification with a silane coupling agent or the like, or carbon black of which the surface has been oxidized.

When the thermoplastic resin pellet according to the present embodiment contains another filler, the content of the other filler is 0.01% by mass or more and 5% by mass or less, preferably 0.1% by mass or more and 3% by mass or less, and preferably 0.5% by mass or more and 1% by mass or less, with respect to 100% by mass of the total amount of the thermoplastic resin pellets.

Additive

Examples of the additives include a flame retardant, a conductivity imparting agent, a crystal nucleating agent, a UV absorber, an antioxidant, an anti-vibration agent, an antibacterial agent, an insect repellent, a deodorant, a coloring inhibitor, a heat stabilizer, a mold release agent, an antistatic agent, a plasticizer, a lubricant, a colorant, a pigment, a dye, a foaming agent, an antifoaming agent, a viscosity modifier, and a surfactant.

Examples of the lubricant include a wax (carnauba wax or the like), a higher fatty acid (stearic acid or the like), a higher fatty acid salt, a higher alcohol (stearyl alcohol or the like), and a higher fatty acid amide (a stearic acid amide, an erucic acid amide, or the like). From the viewpoint of heat resistance during molding, a higher fatty acid salt is preferable, and a higher fatty acid metal salt is more preferable.

The higher fatty acid metal salt is a metal salt of a long-chain fatty acid having 12 or more carbon atoms. The number of carbon atoms thereof is preferably 12 or more and 28 or less, and the number of carbon atoms thereof is more preferably 12 or more and 18 or less.

Specific examples of the long-chain fatty acid include lauric acid, myristic acid, palmitic acid, stearic acid, oleic acid, behenic acid, and montanoic acid.

Specific examples of the higher fatty acid metal salt include lithium laurate, calcium laurate, barium laurate, lithium stearate, barium stearate, sodium stearate, potassium stearate, calcium stearate, aluminum stearate, magnesium stearate, magnesium behenate, calcium behenate, and barium behenate.

As described above, the thermoplastic resin pellet according to the present embodiment contains the thermoplastic resin (A) and the fibrous filler (B), where the length-weighted average fiber length of the fibrous filler (B) is 5 mm or more and less than 50 mm, the pellet length of the thermoplastic resin pellet and the length-weighted average fiber length of the fibrous filler (B) are substantially the same, and the maximum cross-sectional height Rt of the surface of the thermoplastic resin pellet is less than 120 μm.

In thermoplastic resin pellets in which the length-weighted average fiber length of the fibrous filler (B) is 5 mm or more so that the fibrous filler (B) is relatively long fiber, and the pellet length of the thermoplastic resin pellet and the length-weighted average fiber length of the fibrous filler (B) are substantially the same, as in the thermoplastic resin pellet according to the present embodiment, there is an advantage that, for example, the mechanical strength of the molded article can be improved, whereas the metricity tends to be generally poor.

On the other hand, in the thermoplastic resin pellet according to the present embodiment, because the maximum cross-sectional height Rt of the surface is less than 120 μm, the friction between the pellets in the hopper and the friction between the pellets and the wall surface of the apparatus is reduced, whereby the fluidity of the pellets is improved, and the pellets are smoothly transported. In addition, because the pellets easily flow into the space between the cylinder and the screw in the molding machine, the pellets can be smoothly transported from the metering unit to the compression unit.

As a result, according to the thermoplastic resin pellet according to the present embodiment, the metering stability at the time of producing a molded article is improved.

In addition, according to the thermoplastic resin pellet according to the present embodiment, the metering stability at the time of producing a molded article is improved even when the fibrous filler (B) having a relatively large number of fibers (about 30,000 to 55,000) (for example, large tow) is used.

(Method for Producing Thermoplastic Resin Pellet)

The method for producing a thermoplastic resin pellet in the present embodiment includes, for example, a step of impregnating a fiber bundle which is a raw material of the fibrous filler (B), with the thermoplastic resin (A) in a melted state to obtain a strand-shaped resin structural body, a step of processing the strand-shaped resin structural body so that a maximum cross-sectional height Rt can be less than 120 μm; and a step of cutting the processed resin structural body to be pelletized.

Producing Apparatus for Producing Thermoplastic Resin Pellet

Figure 4:
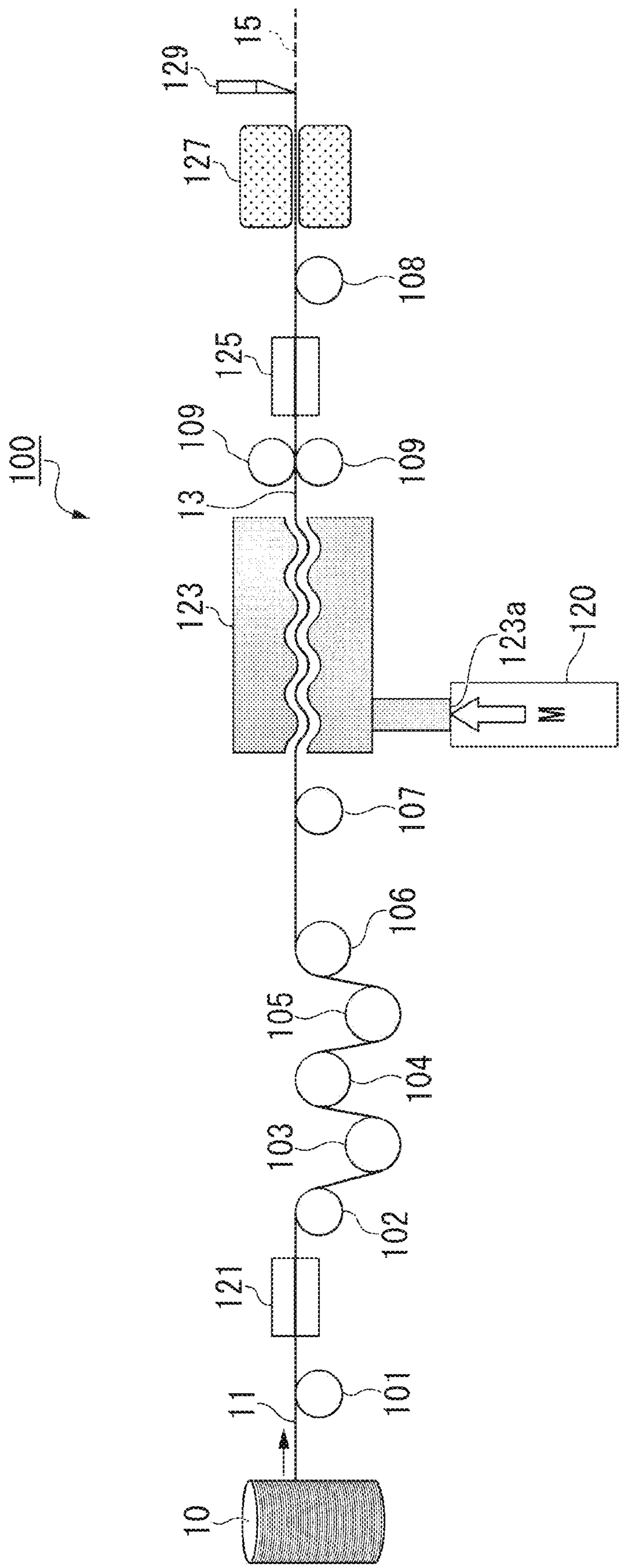
FIG. 4 is a schematic view showing an example of a producing apparatus of the thermoplastic resin pellet according to the present embodiment.

FIG. 4 shows one embodiment of the producing apparatus for the thermoplastic resin pellet.

In the present embodiment shown in FIG. 4, a description will be made for a case of obtaining resin pellets 15 by using a fiber roving 10 in which a fiber bundle 11 in which a plurality of fibrous fillers are made to converge with a sizing-agent is rolled up into a roll.

As shown in FIG. 4, a producing apparatus 100 includes a pre-heating part 121, an impregnation part 123, a cooling part 125, a pick-up part 127, a cutting part 129, transport rolls 101 to 108, and a shaping roll 109. In the producing apparatus 100 shown in FIG. 4, an extruder 120 is connected to the impregnation part 123.

FIG. 4 shows a state in which the fiber bundle 11 is continuously unrolled from the fiber roving 10. In the present embodiment, the resin pellets 15 are produced while the fiber bundle 11 unrolled from the fiber roving 10 is transported in the longitudinal direction by the transport rolls 101 to 108.

The number-average fiber diameter of the fiber roving 10 is not particularly limited; however, it is preferably 1 μm to 40 μm and more preferably 3 μm to 35 μm.

It is preferably 1 to 15 μm, more preferably 3 to 10 μm, and still more preferably 4 to 9 μm when the fibrous filler is carbon fibers.

It is preferably 5 to 35 μm, more preferably 10 to 25 μm, and still more preferably 10 to 20 μm when the fibrous filler is glass fibers.

For the number-average fiber diameter of the fiber roving 10, the fibrous filler is observed by a scanning electron microscope (1,000 times), and the number-average value of values obtained by measuring the fiber diameters of the 500 fibrous fillers which have been randomly selected is adopted.

When the number-average fiber diameter of the fiber roving 10 is within the preferred range described above, the mechanical strength is efficiently improved.

In the present embodiment, a fibrous filler which has been subjected to treatment with a sizing-agent (sizing agent) is used as the fibrous filler. A fibrous filler which has been appropriately subjected to sizing treatment has excellent productivity and quality stability during pellet production and thus makes it possible to reduce the variations in physical properties of the molded article.

The sizing-agent (sizing agents) is not particularly limited. However, examples thereof include a nylon-based polymer, a polyether-based polymer, an epoxy-based polymer, an ester-based polymer, a urethane-based polymer, or a mixed polymer thereof, or a modified polymer of each of the above polymers. In addition, it is also possible to use known coupling agents such as so-called silane coupling agents such as amino silane and epoxy silane, and titanium coupling agents.

In the fibrous filler that is used in the resin pellet according to the present embodiment, it is not necessary for the single fibers to be arranged in one direction; however, a state in which the single fibers are arranged in one direction and the fiber bundle is continuous over the length direction of the fibers is preferable from the viewpoint of the productivity in the process of producing a molding material.

The number of fibers in the fiber roving 10 is preferably 3,000 or more, more preferably 10,000 or more, and still more preferably 30,000 or more.

In addition, the number of fibers in the fiber roving 10 is preferably 60,000 or less, more preferably 60,000 or less, and still more preferably 55,000 or less. For example, the number of fibers in the fiber roving 10 is preferably 3,000 or more and 60,000 or less, more preferably 10,000 or more and 60,000 or less, and still more preferably 30,000 or more and 55,000 or less.

When the number of fibers of the fiber roving 10 is within the preferred range described above, the metering stability is further improved in a case of producing a molded article using the thermoplastic resin pellets produced using the fiber roving 10.

In the pre-heating part 121, the fiber bundle 11 that is unrolled from the fiber roving 10 is dried by heating. The heating temperature at that time is not particularly limited; however, it is, for example, 50° C. to 250° C.

In addition, the heating time in the pre-heating part 121 is not particularly limited; however, it is, for example, 3 seconds to 30 seconds.

In the impregnation part 123, the fiber bundle 11 is impregnated with a molding material M (the thermoplastic resin (A) and other components to be blended as necessary) other than the fiber bundle 11.

The molding material M may be charged from a supply port **123*a*, and the fiber bundle 11 may be impregnated with a molten material obtained by carrying out heating, in the impregnation part 123. Alternatively, the molding material M which has been subjected to melt kneading may be charged from the supply port 123*a* by the extruder 120 to impregnate the fiber bundle 11**.

Then, in the embodiment shown in FIG. 4, a resin structural body 13, in which the fiber bundle 11 has been impregnated and coated with the molten material, is obtained.

The heating temperature in the impregnation part 123 is appropriately determined according to the kind of the thermoplastic resin (A). It is preferably set to a temperature that is higher by 10° C. to 80° C. than the flow starting temperature of the thermoplastic resin (A), and it is, for example, 300° C. to 400° C.

In the impregnation part 123, depending on the characteristics and the like demanded for the molded article, 100 parts by mass of the thermoplastic resin (A) is subjected to impregnation with preferably 10 parts by mass or more and 150 parts by mass or less of the fibrous filler (fiber bundle 11), more preferably 20 parts by mass or more and 90 parts by mass or less of the fibrous filler, and still more preferably 30 parts by mass or more and 80 parts by mass or less of the fibrous filler.

When the blending amount of the fibrous filler is equal to or larger than the lower limit value of the preferred range described above, the metering stability at the time of producing a molded article is further improved. On the other hand, when it is equal to or smaller than the upper limit value of the preferred range described above, the fiber opening of the fiber bundle and the impregnation of the fiber bundle 11 with the thermoplastic resin (A) are likely to be easy.

In a case of changing a diameter of a nozzle of a die head at an outlet of the impregnation part 123, with respect to the diameter of the fiber bundle 11, it is possible to adjust the blending ratio of the thermoplastic resin (A) to the fibrous filler (B) in the resin structural body 13.

The nozzle shape of the die head at the outlet of the impregnation part 123 is not particularly limited, and it may be a round form, a quadrangular form, or the like. However, a shape of a round form is preferable because the resin structural body 13 can be further deformed during the rolling of the shaping roll 109, and the impregnation properties of the thermoplastic resin (A) are improved.

Figure 5:
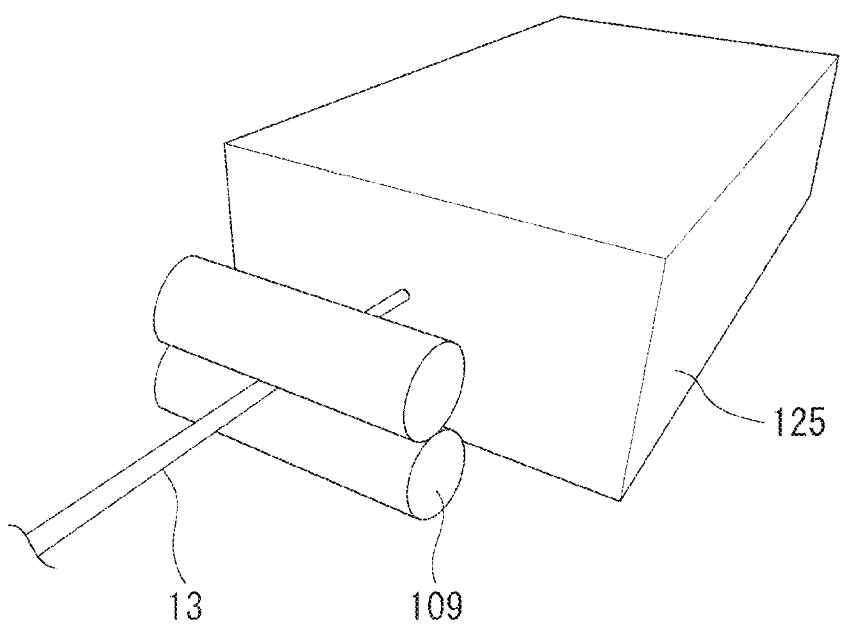
FIG. 5 is a schematic view showing an example of a shaping roll in the producing apparatus of the thermoplastic resin pellet according to the present embodiment.

As shown in FIG. 5, when the resin structural body 13 in a state of being heated in the impregnation part 123 (the resin structural body 13 in which the fiber bundle has been impregnated and coated with the molten material) passes between a pair of shaping rolls 109 disposed vertically and then is rolled, the maximum cross-sectional height Rt of the surface of the resin pellet 15 to be finally obtained is less than 120 μm.

From the viewpoint that the maximum cross-sectional height Rt of the surface of the resin pellet 15 is easily made to be less than 120 μm, the material of the shaping roll 109 is preferably a metal. In addition, the surface of the shaping roll 109 is preferably smooth.

A case where the surface of the shaping roll 109 is smooth is preferably such that, for example, the maximum cross-sectional height Rt, the arithmetic average roughness Ra, the maximum average roughness Rz, the maximum peak height Rp, the maximum valley depth Rv, or the root mean square height Rq of the shaping roll 109, which is measured by the following method, is equal to or smaller than a value described later.

The maximum cross-sectional height Rt of the surface of the shaping roll 109 is preferably 1 μm or less, more preferably 0.8 μm or less, and still more preferably 0.5 μm or less.

In addition, the arithmetic average roughness (Ra) of the inner surface of the shaping roll 109 is preferably 0.1 μm or less, more preferably 0.08 μm or less, and still more preferably 0.05 μm or less.

The maximum average roughness Rz of the surface of the shaping roll 109 is preferably 0.8 μm or less, more preferably 0.4 μm or less, and still more preferably 0.2 μm or less.

The maximum peak height Rp of the surface of the shaping roll 109 is preferably 1 μm or less, more preferably 0.8 μm or less, and still more preferably 0.5 μm or less.

The maximum valley depth Rv of the surface of the shaping roll 109 is preferably 1 μm or less, more preferably 0.8 μm or less, and still more preferably 0.5 μm or less.

The root mean square height Rq of the surface of the shaping roll 109 is preferably 1 μm or less, more preferably 0.8 μm or less, and still more preferably 0.5 μm or less.

Each surface roughness of the shaping roll 109 is a value measured under the following measurement conditions in accordance with JIS B 0601-2001 (ISO 4287-1997), by the same method as the method for each surface roughness of the surface of the thermoplastic resin pellet described above.

<Measurement Conditions>

| |
|---|
| Measurement magnification: 2.0 times |
| Feed rate: 0.5 mm/s |
| Trace length: 4.8 mm |
| Cutoff: λc = 0.8 mm |

-continued

| |
|---|
| Evaluation length: 4.0 mm |
| Pre-length: 1.0 mm |
| Filter characteristic: Gaussian |
| Leveling processing: Straight line (entire area) |
| Detector: Contact PUDJ2S |

When the resin structural body 13 in a state of being heated in the impregnation part 123 (the resin structural body 13, in which the fiber bundle has been impregnated and coated with the molten material) passes between a pair of shaping rolls 109 disposed vertically, the shaping is carried out so that the maximum cross-sectional height Rt of the surface of the resin pellet 15 to be finally obtained is less than 120 μm.

In addition, when the resin structural body 13 passes between the shaping rolls 109, it is possible to suppress the generation of the froth derived from the fibrous filler (B).

The material of the shaping roll 109 is not particularly limited; however, a metal material is preferable from the viewpoint of heat resistant temperature and appropriate heat dissipation. In addition, the surface of the shaping roll 109 is preferably smooth.

Examples of the metal as the material of the shaping roll 109 include iron, copper, nickel, gold, silver, platinum, cobalt, zinc, lead, tin, titanium, chromium, aluminum, magnesium, manganese, and alloys thereof (stainless steel, brass, phosphor bronze, and the like). In addition, a metal as a thin film or a coat (a plating metal, a vapor deposition film, a coating film, or the like) may be favorable. Among them, stainless steel is more preferable from the viewpoints of corrosion resistance and heat dissipation.

The temperature of the resin structural body 13 when the resin structural body 13 is allowed to pass between the shaping rolls 109 is not particularly limited; however, it is preferably −100° C. to +60° C. and more preferably 0° C. to +60° C. with respect to the flow starting temperature of the thermoplastic resin (A) to be contained.

When the temperature of the resin structural body 13 at the time when the resin structural body 13 is allowed to pass between the shaping rolls 109 is a temperature that is equal to or higher than "the flow starting temperature of the liquid crystal polyester resin (A) to be contained −100° C.", it is easy to shape the resin structural body 13 into a desired shape.

In addition, when the temperature of the resin structural body 13 is a temperature that is equal to or lower than "the flow starting temperature of the liquid crystal polyester resin (A) to be contained +60° C.", the resin structural body 13 is less likely to be stuck to the shaping roll 109.

The shaping roll 109 is preferably a roller type shaping roll having a bearing inside. In a case of using the roller type, the pressure during shaping can be released in the transportation direction, and thus uneven impregnation or fluffing can be suppressed.

The bearing inside the shaping roll 109 is not particularly limited to a ball bearing, an angular ball bearing, a cylindrical roller bearing, a tapered roller bearing, a spherical roller bearing, a needle bearing, or a slide bearing; however, a ball bearing that has low rotational resistance and has excellent balance with the pick-up speed can be preferably used.

The disposition position of the shaping roll 109 is not particularly limited; however, a position 15 cm away from the die head is preferable. When the shaping roll 109 is made to be away from the die head by 15 cm, it is possible to carry out dissipation while obtaining the influence of the heat of the heater of the die head, and thus it is possible to further stabilize the temperature of the shaping roll 109. The distance referred to here is the distance from the die head to the contact point between the shaping roll 109 and the resin structural body 13.

In addition, the disposition position of the shaping roll 109 is not particularly limited; however, a position 15 cm away from the cooling part 125 is preferable. When the shaping roll 109 is made to be away from the cooling part 125 by 15 cm, it is possible to further stabilize the temperature of the shaping roll 109 while obtaining the influence of the cooling part 125. The distance referred to here is the distance from the contact point between the shaping roll 109 and the resin structural body 13 to the cooling part 125.

Therefore, the disposition position of the shaping roll 109 disposed between the die head and the cooling part 125 is preferably a position 15 cm away from both the die head and the cooling part 125.

The gap between the upper and lower shaping rolls depends on the fineness of the fibrous filler (B) to be used or the size (volume content) of the resin structural body 13; however, it is preferably adjusted to be approximately the same as or less than the width of D2 of the pellet to be produced. Specifically, the gap between the upper and lower rolls is preferably 3.0 mm or less, more preferably 450 μm or more and 3.0 mm or less, still more preferably 450 μm or more and 2.0 mm or less, and particularly preferably 450 μm or more and 1.0 mm or less. The more preferred range of the above-described range, the more the impregnation properties of the resin pellets are improved. The gap between the upper and lower rolls indicates a distance between contact points of the resin structural body and the roll when the resin structural body has been allowed to pass through the roll at a pick-up speed of 0 m/min.

In the cooling part 125, the resin structural body 13 shaped by the shaping roll 109 is cooled to, for example, 50° C. to 150° C. The cooling time is not particularly limited; however, it is, for example, 3 seconds to 30 seconds.

In the pick-up part 127, the resin structural body 13 cooled in the cooling part 125 is continuously picked up and unrolled to the next cutting part 129.

In the cutting part 129, the resin structural body 13 after cooling is cut to a predetermined length to produce the resin pellets 15. The cutting part 129 includes, for example, a rotary blade or the like.

Method for Producing Thermoplastic Resin Pellet Using Producing Apparatus 100

Using the producing apparatus 100 described above, the thermoplastic resin pellet according to the present embodiment is produced as follows.

Step of Obtaining Strand-Shaped Resin Structural Body:

First, the fiber bundle 11 is heated to be dried in the pre-heating part 121 while carrying out continuous unrolling of the fiber bundle 11, in which a plurality of single fibers are made to converge with a sizing-agent, from the fiber roving 10.

Next, while supplying the fiber bundle 11 after drying to the impregnation part 123, the molding material M, which has been subjected to melt kneading, is charged from the supply port **123*a* by the extruder 120 to impregnate the fiber bundle 11 with the molding material M in the melted state. As a result, a strand-shaped resin structural body 13**, in which the fiber bundle has been impregnated and coated with the molten material, is obtained.

Step of Processing Strand-Shaped Resin Structural Body:

The obtained strand-shaped resin structural body 13 is shaped by the shaping roll 109 so that the maximum cross-sectional height Rt of the surface of the resin structural body 13 is less than 120 μm. Next, the shaped resin structural body 13 is cooled in the cooling part 125.

In the resin structural body 13 to be obtained here, the fibers are arranged to be substantially parallel to the longitudinal direction of the resin structural body 13.

The phrase "the fibers are arranged to be substantially parallel to the longitudinal direction of the resin structural body" indicates that the angle between the longitudinal direction of the fiber and the longitudinal direction of the resin structural body is substantially 0°, specifically, a state where the angle between the both longitudinal directions of the fiber and the resin structural body is −5° to 5°.

Pelletizing Step:

Next, the resin structural body 13 after cooling is picked up in a strand shape at the pick-up part 127 and is unrolled to the cutting part 129.

Next, in the cutting part 129, the strand-shaped resin structural body 13 is cut in the longitudinal direction at a predetermined length to obtain the resin pellets 15.

Here, the predetermined length referred to for the resin pellets 15 is a length so that the length-weighted average fiber length of the fibrous filler (B) can be 5 mm or more and less than 50 mm, and typically, the cutting is carried out so that the pellet length of the resin pellets 15 is 5 mm or more and less than 50 mm.

In the same manner as described above, the thermoplastic resin pellet (the resin pellets 15) containing the thermoplastic resin (A) and the fibrous filler (B) are produced.

The resin pellets 15 are resin pellets obtained by hardening the fibrous filler (B) with the thermoplastic resin (A), where the fibrous filler is arranged to be substantially parallel to the longitudinal direction of the pellet. In addition, the length of the fibrous filler arranged in the resin pellets 15 is substantially the same length as the length of the pellet. The length of the resin pellets 15 produced in the present embodiment is, for example, 5 mm or more and less than 50 mm.

In this way, the fibrous filler is arranged to be substantially parallel to the longitudinal direction of the pellet, and the length of the fibrous filler is set to be substantially the same length as the length of the pellet. Therefore, it is possible for the remaining fibrous filler to be made into long fibers in a case of producing a molded article by using the pellet, which is effective for the improvement of the metering stability.

In the present embodiment shown in FIG. 4, the resin structural body 13 is shaped by using the shaping roll 109, thereby being controlled so that the maximum cross-sectional height Rt of the surface of the resin pellet 15 is less than 120 μm. That is, a means for rolling the resin structural body 13 is employed in the step of processing the strand-shaped resin structural body.

More specifically, the method for producing a thermoplastic resin pellet according to the embodiment described above includes a step of impregnating a fiber bundle which is a raw material of the fibrous filler (B), with the thermoplastic resin (A) in a melted state to obtain a strand-shaped resin structural body, a step of rolling the strand-shaped resin structural body so that a maximum cross-sectional height Rt can be less than 120 μm; and a step of cutting the rolled resin structural body to be pelletized.

For example, when a liquid crystal polyester resin having a low melt viscosity is used as the thermoplastic resin (A), the maximum cross-sectional height Rt of the surface of the resin pellets 15 can be controlled to be less than 120 μm by the method for producing a thermoplastic resin pellet according to the embodiment described above.

On the other hand, when a thermoplastic resin other than the liquid crystal polyester resin is used, the melt viscosity is high as compared with the liquid crystal polyester resin, the solidification of the melted resin is slow, and the transferability is low. Therefore, it is difficult to control the maximum cross-sectional height Rt, and thus, instead of the step of rolling the resin structural body or in addition to the step of rolling the resin structural body, it is necessary to carry out a step of polishing the resin structural body 13 or the resin pellets 15. Specific examples of the step of polishing the resin structural body 13 or the resin pellets 15 include a step of polishing the resin structural body 13 or the resin pellets 15 with a file.

More specifically, the method for producing a thermoplastic resin pellet according to one embodiment contains a step of impregnating a fiber bundle which is a raw material of the fibrous filler (B), with the thermoplastic resin (A) in a melted state to obtain a strand-shaped resin structural body, a step of polishing the strand-shaped resin structural body so that a maximum cross-sectional height Rt can be less than 120 μm; and a step of cutting the processed resin structural body to be pelletized.

In addition, the method for producing a thermoplastic resin pellet according to one embodiment includes a step of impregnating a fiber bundle which is a raw material of the fibrous filler (B), with the thermoplastic resin (A) in a melted state to obtain a strand-shaped resin structural body, a step of cutting the strand-shaped resin structural body to be pelletized, and a step of polishing the pellet so that the maximum cross-sectional height Rt of the surface of the pellet can be less than 120 μm.

In addition, in the producing apparatus 100 shown in FIG. 4, although a pair of the shaping rolls 109 disposed vertically are used, there is no particular limitation as long as the shape of the resin structural body 13 can be changed. For example, only one shaping roll (on one side) may be disposed.

The present invention has the following aspects.

"1" A thermoplastic resin pellet containing:

a thermoplastic resin (A); and a fibrous filler (B), in which a length-weighted average fiber length of the fibrous filler (B) is 5 mm or more and less than 50 mm, a pellet length of the thermoplastic resin pellet and the length-weighted average fiber length of the fibrous filler (B) are substantially the same, and a maximum cross-sectional height Rt of a surface of the thermoplastic resin pellet is less than 120 μm.

"2" The thermoplastic resin pellet according to "1", in which a content of the thermoplastic resin (A) is preferably 40% by mass or more and 90% by mass or less, more preferably 45% by mass or more and 85% by mass or less, and still more preferably 50% by mass or more and 80% by mass or less, with respect to 100% by mass of the total amount of the thermoplastic resin pellets.

"3" The thermoplastic resin pellet according to "1" or "2", in which a content of the fibrous filler (B) is preferably 10% by mass or more and 60% by mass or less, more preferably 15% by mass or more and 55% by mass or less, and still more preferably 20% by mass or more and 50% by mass or less, with respect to 100% by mass of the total amount of the thermoplastic resin pellets.

"4" The thermoplastic resin pellet according to any one of "1" to "3", in which the arithmetic average roughness Ra of the surface of the thermoplastic resin pellet is preferably 11 μm or less, the maximum average roughness Rz of the surface of the thermoplastic resin pellet is preferably 1 μm or more and 100 μm or less, more preferably 5 μm or more and 80 μm or less, and still more preferably 10 μm or more and 60 μm or less, the maximum peak height Rp of the surface of the thermoplastic resin pellet is preferably 1 μm or more and 80 μm or less, more preferably 2 μm or more and 60 μm or less, and still more preferably 3 μm or more and 40 μm or less, the maximum valley depth Rv of the surface of the thermoplastic resin pellet is preferably 1 μm or more and 70 μm or less, more preferably 3 μm or more and 50 μm or less, and still more preferably 5 μm or more and 30 μm or less, and the root mean square height Rq of the surface of the thermoplastic resin pellet is preferably 1 μm or more and 80 μm or less, more preferably 2 μm or more and 60 μm or less, and still more preferably 3 μm or more and 40 μm or less.

"5" The thermoplastic resin pellet according to any one of "1" to "4", in which the thermoplastic resin pellet that has characteristics that;

when the thermoplastic resin pellet is charged into a hopper of an injection molding machine TR450EH3 (manufactured by Sodick Co., Ltd.) and injected into a mold having a mold temperature of 100° C. at an injection speed of 200 mm/s in the injection molding machine having a cylinder temperature of 360° C. to continuously produce fifteen flat plate-shaped molded articles having a size of 150 mm×150 mm×thickness 4 mm, and each of the metering times is measured for a total of 11 shots when the 3rd to 13th flat plate-shaped molded articles are subjected to molding, the average value of the metering times for the 11 shots is preferably less than 65 s, more preferably 63 s or less, and still more preferably 60 s or less.

(Molded Article)

The molded article according to the present embodiment is a molded article produced by using the thermoplastic resin pellet described above.

It is possible to obtain the molded article according to the present embodiment by a known molding method using the thermoplastic resin pellet. Specifically, the molding method is preferably a melt molding method, and examples thereof include injection molding, blow molding, vacuum molding, and press molding. Among them, injection molding is preferable.

For example, when the thermoplastic resin pellet described above is used as a molding material and molded according to an injection molding method, the thermoplastic resin pellet is melted using a known injection molding machine, and the melted thermoplastic resin pellet is molded by being injected into a mold.

Examples of the known injection molding machine include TR450EH3 manufactured by Sodick Co., Ltd., and a hydraulic horizontal molding machine, model: PS40E5ASE, manufactured by NISSEI PLASTIC INDUSTRIAL Co., Ltd.

The temperature conditions for injection molding are appropriately determined according to the kind of the thermoplastic resin (A), and it is preferable to set the cylinder temperature of the injection molding machine to a temperature that is higher by 10° C. to 80° C. than the flow starting temperature of the thermoplastic resin (A) to be used.

In terms of productivity, the temperature of the mold is preferably set in a range of room temperature (for example, 23° C.) to 180° C.

Other injection conditions, such as the screw rotation speed, the back pressure, the injection speed, the holding pressure, and the holding pressure time, may be adjusted as appropriate.

The length-weighted average fiber length of the fibrous filler (B) in the molded article according to the present embodiment is preferably 0.5 mm or more and less than 50 mm, more preferably 0.8 mm or more and 20 mm or less, and still more preferably 0.8 mm or more and 10 mm or less.

When the length-weighted average fiber length of the fibrous filler (B) in the molded article according to the present embodiment is within the preferred range described above, the mechanical strength of the molded article can be further improved.

[Measurement of Length-Weighted Average Fiber Length of Fibrous Filler (B) in Molded Article]

Procedure (1): A part (for example, width 10 mm×length 20 mm×thickness 4 mm) is cut out from the molded article to obtain a test piece.

Next, the test piece containing carbon fibers is heated at 500° C. for 3 hours in a muffle furnace, and the test piece containing glass fibers is heated at 600° C. for 4 hours to remove the resin content.

Procedure (2): The resin content is removed from the test piece to obtain only the fibrous filler (B), and the resultant was dispersed in 1,000 mL of an aqueous solution containing 0.05% by volume of a surfactant (Micro 90, manufactured by INTERNATIONAL PRODUCTS CORPORATION) to prepare a fibrous filler dispersion liquid.

Procedure (3): 100 mL is extracted from the fibrous filler dispersion liquid and diluted to 10 times with pure water. 50 mL is extracted from the dispersion liquid after dilution and dispersed in a petri dish. Subsequently, the fibrous filler dispersed in the petri dish is observed with a microscope (main body: VHX-8000, lens: VH-ZOOR, manufactured by KEYENCE CORPORATION, magnification: 10 to 25 times), and five images per sample are captured without overlaps of taken areas. However, when the fibrous filler is carbon fibers, 50 mL is extracted from the dispersion liquid after dilution and then filtered under reduced pressure using a φ90 mm Kiriyama funnel filter paper (No. 5C), and images of the carbon fibers dispersed on the filter paper are captured.

Procedure (4): The fiber lengths of all of the five captured images are measured using image processing software (WinROOF2018, manufactured by MITANI CORPORATION) as follows.

<Method for Measuring Fiber Length>

(a) The captured images are subjected to the monochrome pixel conversion processing.

(b) Binarization processing is carried out so as to color only the imaged fibers.

(c) The fiber length is measured using the needle shape separation function of the image processing software.

(d) The fiber length of the fiber that could not be subjected to the binarization in (c) or the fiber length of the curved fiber is measured according to the multi-point measurement, and the fiber in contact with the edge of the image is not subjected to the measurement. However, in (c) and (d), fibers of 20 μm or less are determined to be noise and not included in the number n of fibers measured. In a case of $n>500$, that is, when the number n of fibers measured does not exceed 500, the procedure returns to the procedure (3), additional images are captured, and the measurement is carried out until n exceeds 500.

Procedure (5): From the fiber lengths of the fibrous fillers measured in Procedure (4), the length-weighted average fiber length $lm=(\Sigma li^2\}\times ni)/(\Sigma li\times ni)$ is determined ($\Sigma ni>500$).

li: Fiber length of fibrous filler ni: Number of fibrous fillers having fiber length li The above-described molded article according to the present embodiment is capable of being applied to any use applications to which the thermoplastic resin is generally applicable, among which a use application in the automotive field is particularly suitable.

Examples of the use application in the automotive field include, as injection-molded articles for automobile interior materials, an injection-molded article for a ceiling material, an injection-molded article for a wheelhouse cover, an injection-molded article for a trunk compartment lining, an injection-molded article for an instrument panel surface material, an injection-molded article for a steering wheel cover, an injection-molded article for an armrest, an injection-molded article for a headrest, an injection-molded article for a seat belt cover, an injection-molded article for a shift lever boot, an injection-molded article for a console box, an injection-molded article for a horn pad, an injection-molded article for a knob, an injection-molded article for an airbag cover, injection-molded articles for various trims, injection-molded articles for various pillars, an injection-molded article for a door lock bezel, an injection-molded article for a grab box, an injection-molded article for a defroster nozzle, an injection-molded article for a scuff plate, an injection-molded article for a steering wheel, and an injection-molded article for a steering column cover.

In addition, examples of the injection-molded article for the automobile exterior material include an injection-molded article for a bumper, an injection-molded article for a spoiler, an injection-molded article for a mudguard, an injection-molded article for a side molding, an injection-molded article for a door mirror housing, and an injection-molded article for an underbody shield.

Examples of other injection-molded articles for automobile components include an injection-molded article for an automobile headlamp, an injection-molded article for a glass run channel, an injection-molded article for a weather strip, an injection-molded article for a hose such as an injection-molded article for a drain hose, an injection-molded article for a windshield washer tube, an injection-molded article for tubes, an injection-molded article for a rack and pinion boot, an injection-molded article for a gasket, an injection-molded article for a bumper beam, an injection-molded article for a crash box, injection-molded articles for various members, an injection-molded article for a suspension system, an injection-molded article for a front end module, an injection-molded article for a radiator support, and an injection-molded article for a back door inner part.

In addition, in addition to the above, it is also possible to apply the molded article according to the present embodiment to use applications such as a sensor, a LED lamp, a connector, a socket, a resistor, a relay case, a switch, a coil bobbin, a capacitor, a variable condenser case, an optical pickup, an oscillator, various terminal boards, a transformer, a plug, a printed circuit board, a tuner, a speaker, a microphone, a headphone, a small motor, a magnetic head base, a power module, a semiconductor, a liquid crystal display, an FDD carriage, an FDD chassis, a motor brush holder, a parabolic antenna, a computer related component, a microwave oven component, a sound and voice equipment component, a lighting component, an air conditioner component, an office computer related component, a telephone and fax-related component, and a copier-related component.

Because the thermoplastic resin pellet described above is used, the molded article according to the present embodiment described above has a stable metering time and small variations in physical properties.

EXAMPLES

Hereinafter, the present invention will be described in more detail with reference to specific examples. However, the present invention is not limited to Examples shown below.

[Flow Starting Temperature of Liquid Crystal Polyester Resin]

A liquid crystal polyester resin described later was subjected to the evaluation of the flow starting temperature by using a flow tester (model: CFT-500, manufactured by Shimadzu Corporation). Specifically, a capillary type rheometer attached with a die having an inner diameter of 1 mm and a length of 10 mm was filled with approximately 2 g of the liquid crystal polyester resin. Next, the temperature at which the melt viscosity was 4,800 Pa·s (48,000 poises) was defined as the flow starting temperature when the liquid crystal polyester resin subjected to the filling was extruded from the nozzle of the rheometer with a temperature increase of 4° C./min at a load of 9.8 MPa (100 kg/cm$^2$).

[Measurement of Length-Weighted Average Fiber Length of Fibrous Filler (Carbon Fiber or Glass Fiber) in Resin Pellet]

The length-weighted average fiber length of the fibrous filler in the resin pellet described later was measured according to the following method.

Procedure (1): 5 g of resin pellets were heated in a muffle furnace to remove a resin content.

Regarding the heating conditions, in a case of carbon fibers, the carbon fibers were heated at 500° C. for 3 hours, and in a case of glass fibers, the glass fibers were heated at 600° C. for 4 hours.

Procedure (2): The resin content was removed from the resin pellets to obtain only the fibrous filler, which was subsequently dispersed in 1,000 mL of an aqueous solution containing 0.05% by volume of a surfactant (Micro 90, manufactured by INTERNATIONAL PRODUCTS CORPORATION) to prepare a fibrous filler dispersion liquid.

Procedure (3): 100 mL was extracted from the fibrous filler dispersion liquid and diluted to 10 times with pure water. 50 mL was extracted from the dispersion liquid after dilution and dispersed in a petri dish. Subsequently, the fibrous filler dispersed in the petri dish was observed with a microscope (main body: VHX-8000, lens: VH-ZOOR, manufactured by KEYENCE CORPORATION, magnification: 10 to 25 times), and five images per sample were captured without overlaps of taken areas. However, when the fibrous filler was carbon fibers, 50 mL was extracted from the dispersion liquid after dilution and then filtered under reduced pressure using a Φ90 mm Kiriyama funnel filter paper (No. 5C), and images of the carbon fibers dispersed on the filter paper were captured.

Procedure (4): The fiber lengths of all of the five captured images were measured using image processing software (WinROOF2018, manufactured by MITANI CORPORATION) as follows.

<Method for Measuring Fiber Length>

(a) The captured images were subjected to the monochrome pixel conversion processing.

(b) Binarization processing was carried out so that only the imaged fibers were colored.

(c) The fiber length was measured using the needle shape separation function of the image processing software.

(d) The fiber length of the fiber that could not be subjected to the binarization in (c) or the fiber length of the curved fiber was measured according to the multi-point measurement, and the fiber in contact with the edge of the image was not subjected to the measurement. However, in (c) and (d), fibers of 20 μm or less were determined to be noise and not included in the number n of fibers measured. In a case of n>500, that is, when the number n of fibers measured did not exceed 500, the procedure returned to the procedure (3), additional images were captured, and the measurement was carried out until n exceeded 500.

Procedure (5): From the fiber lengths of the fibrous fillers measured in Procedure (4), the length-weighted average fiber length $lm=(\Sigma li^2\}\times ni)/(\Sigma li\times ni)$ was determined ($\Sigma ni>500$).

li: Fiber length of fibrous filler ni: Number of fibrous fillers having fiber length li

[Measurement of Major Axis D1 and Minor Axis D2 of Cross Section of Resin Pellet]

Procedure (i): Resin pellets of each example were placed in a columnar mold that was sufficiently larger than the resin pellets of each example, and using a fixing jig (Holding blue clips (plastic), manufactured by PRESI Co., Ltd.), the resin pellets of each example were erected and fixed so that the length direction thereof was perpendicular to the bottom surface of the mold.

Procedure (ii): A solution obtained by adding a Cold-Mounting Resin No. 105 (manufactured by Struers) and an M agent (curing agent) for the No. 105 (manufactured by Struers) at a ratio of 100:2 was poured into the columnar mold. Next, it was allowed to stand at room temperature (23° C.) for 1 day or longer to be sufficiently solidified.

Procedure (iii): The solidified columnar sample was taken out from the mold, and using a polishing machine (APO-128, Automax Polisher EV, manufactured by Refine Tec Ltd.), the solidified columnar sample was polished so that the pellet length of the thermoplastic resin pellet 1P could be a length of ½ of the length thereof.

Procedure (iv): A suede cloth No. 52-308 (manufactured by Refine Tec Ltd.) was spread for the polishing machine, and the surface polished to a length of ½ was polished with water containing an alumina powder (Alumina Powder A, manufactured by Refine Tec Ltd.) until the surface was flat and polishing scratches disappeared.

Procedure (v): The surface, which was polished until being flat and until polishing scratches disappeared, was imaged using a microscope (main body: VHX-8000, lens: VH-ZOOR, manufactured by KEYENCE CORPORATION) at a magnification of 10 to 25 times.

Procedure (vi): The captured image was subjected to binarization processing with image processing software (WinRooF2018, manufactured by MITANI CORPORATION), the Feret's diameter was calculated using Feret II from the measurement tool, and the Feret horizontal was defined as the major axis D1 of the cross section of the resin pellet, and the Feret vertical was defined as the minor axis D2 of the cross section of the resin pellet.

Procedure (vii): Five pellets were subjected to the procedures (i) to (vi), and the average values therefrom were adopted as the values of the major axis D1 and the minor axis D2 of each of the resin pellets.

(Producing of Thermoplastic Resin (A))

<Producing of LCP 1>

Into a reactor equipped with a stirrer, a torque meter, a nitrogen gas introduction tube, a thermometer, and a reflux condenser were charged 994.5 g (7.2 mol) of p-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid, and 1347.6 g (13.2 mol) of acetic anhydride, 0.2 g of 1-methylimidazole was added thereto, and the inside of the reactor was sufficiently replaced with nitrogen gas.

Then, the internal temperature of the reactor was increased from room temperature to 150° C. over 30 minutes while carrying out stirring under a stream of nitrogen gas, and then the temperature was maintained at 150° C., and reflux was carried out for 1 hour.

Next, 0.9 g of 1-methylimidazole was added thereto, the temperature was increased from 150° C. to 320° C. for 2 hours and 50 minutes while distilling acetic acid as a byproduct and unreacted acetic anhydride, and a prepolymer was obtained at the time point when an increase in torque was recognized as a reaction termination.

The prepolymer obtained in this way was cooled to room temperature and pulverized with a coarse pulverizer to obtain a prepolymer powder. In a nitrogen atmosphere, the prepolymer powder was heated from room temperature to 220° C. over 1 hour and then heated from 220° C. to 240° C. over 0.5 hours, and the temperature was held at 240° C. for 10 hours to carry out a solid phase polymerization. After the solid phase polymerization, cooling was carried out to obtain a powdery liquid crystal polyester resin 1 (LCP 1).

The flow starting temperature of LCP 1 was 291° C.

<Producing of LCP 2>

6-hydroxy-2-naphthoic acid (1034.99 g, 5.5 moles), 2,6-naphthalenedicarboxylic acid (378.33 g, 1.75 moles), terephthalic acid (83.07 g, 0.5 moles), hydroquinone (272.52 g, 2.475 moles, an excess by 0.225 moles with respect to the total amount of 2,6-naphthalenedicarboxylic acid and terephthalic acid), acetic anhydride (1,226.87 g, 12 moles), and 1-methylimidazole (0.17 g) as a catalyst were placed in a reactor equipped with a stirrer, a torque meter, a nitrogen gas introduction tube, a thermometer, and a reflux condenser, and the gas in the reactor was replaced with nitrogen gas. Then, the internal temperature of the reactor was raised from room temperature to 140° C. over 15 minutes while carrying out stirring under a stream of nitrogen gas, and refluxing was carried out at 140° C. for 1 hour.

Next, while distilling acetic acid as a byproduct and unreacted acetic anhydride, the temperature was increased from 145° C. to 310° C. over 3.5 hours and held at 310° C. for 3 hours, and then the resultant contents were extracted and cooled to room temperature. After pulverizing the obtained solid material to a particle diameter of approximately 0.1 mm to 1 mm using a pulverizer, a solid phase polymerization was carried out under a nitrogen atmosphere by raising the temperature from room temperature to 250° C. over 1 hour, raising the temperature from 250° C. to 310° C. over 9 hours, and holding the temperature at 310° C. for 5 hours.

After the solid phase polymerization, cooling was carried out to obtain a powdery liquid crystal polyester resin 2 (LCP 2).

The flow starting temperature of LCP 2 was 322° C.

(Producing of Resin Pellet)

Example 1

Using a producing apparatus having a form shown in FIG. 4, a thermoplastic resin pellet was obtained as follows. An extruder, model: GTS-40 (manufactured by PLABOR Research Laboratory of Plastics Technology Co., Ltd.), was used as an extruder. EBD-1500A (manufactured by IMEX Co., Ltd.) was used as a belt-type pick-up machine. A fan cutter FCMiniPlus-4TN (manufactured by Hoshi Plastics Co., Ltd.) was used as a pelletizer.

Step of Obtaining Resin Structural Body

First, the belt-type pick-up machine (the pick-up part 127) was operated at a pick-up speed of 10 m/min, whereby a fiber bundle was heated to 200° C. to be dried in the pre-heating part 121 while being continuously unrolled from the fiber roving 10 at a pick-up speed of 10 m/min, where the fiber bundle was Carbon Fiber CF1 (manufactured by Zoltek Corporation, Zoltek (registered trade name) PX35 CONTINUOUS TOW, PAN-based carbon fiber (tensile elastic modulus: 242 GPa, tensile strength: 4,139 MPa, tensile elongation: 1.7%, number-average fiber diameter: 7 μm, number of fibers: 50,000)).

Separately, using the extruder 120, the LCP 1 obtained in <Producing of LCP 1> described above was heated to 340° C. to be prepared in a melted state.

Next, while supplying the dried fiber bundle (carbon fibers) to the die (impregnation part 123) attached to a tip of the extruder 120, the LCP 1 (resin material M) in the melted state was charged from the extruder 120 from the supply port 123*a* of the extruder 120. LCP 1 was melted in the die (impregnation part 123) at 340° C., 82 parts by mass of the Carbon Fiber CF1 was impregnated with 100 parts by mass of the LCP 1 and allowed to pass through a nozzle of φ3.0 mm at the outlet of the die (impregnation part 123) to obtain a resin structural body 13, in which the Carbon Fiber CF1 was arranged to be substantially parallel to the longitudinal direction of the liquid crystal polyester resin layer.

Step of Rolling Resin Structural Body

The obtained resin structural body 13 was rolled by being sandwiched with a pair of the shaping rolls 109 (Φ30 mm, maximum cross-sectional height Rt: 0.20 μm, arithmetic average roughness Ra: 0.02 μm), maximum average roughness Rz: 0.14 μm, maximum peak height Rp: 0.44 μm, maximum valley depth Rv: 0.41 μm, root mean square height Rq: 0.43 μm, axial distance between shaping rolls made of SUS304: 37 mm) disposed vertically so that the maximum cross-sectional height Rt was less than 120 μm. Next, the rolled resin structural body 13 was cooled in the cooling part 125 to 150° C. or lower.

Pelletizing Step

Next, the cooled resin structural body 13 was picked up by the belt-type pick-up machine (pick-up part 127) and unrolled to a pelletizer (cutting part 129), cut to a length of 12 mm in the longitudinal direction thereof to obtain a thermoplastic resin pellet of Example 1, which is shown as resin pellets 15 in FIG. 4.

The length-weighted average fiber length of the Carbon Fiber CF1 in the thermoplastic resin pellets of Example 1, which was measured by the method described in [Measurement of length-weighted average fiber length of fibrous filler (carbon fiber or glass fiber) in resin pellet] described above, was 12 mm which was the same as the pellet length of the thermoplastic resin pellets of Example 1.

In addition, in the thermoplastic resin pellets of Example 1, the major axis D1 of the cross section of the thermoplastic resin pellets of Example 1 was 10 mm, the minor axis D2 thereof was 1.1 mm, and D1/D2 thereof was 9.1.

Comparative Example 1

Thermoplastic resin pellets of Comparative Example 1 were produced under the same conditions as those in Example 1, except that the die outlet in Example 1 was changed to a die head having a width of 10 mm and a length of 1.2 mm, the shaping roll 109 was removed, and the resin structural body 13 was not rolled.

The length-weighted average fiber length of the Carbon Fiber CF1 in the thermoplastic resin pellets of Comparative Example 1, which was measured by the method described in [Measurement of length-weighted average fiber length of fibrous filler (carbon fiber or glass fiber) in resin pellet] described above, was 12 mm which was the same as the pellet length of the thermoplastic resin pellets of Comparative Example 1.

In addition, in the thermoplastic resin pellets of Comparative Example 1, the major axis D1 of the cross section of the thermoplastic resin pellets of Comparative Example 1 was 9.8 mm, the minor axis D2 thereof was 1.1 mm, and D1/D2 thereof was 8.9.

Comparative Example 2

Thermoplastic resin pellets of Comparative Example 2 were produced under the same conditions as those in Example 1, except that the shaping roll 109 in Example 1 was removed, and the resin structural body 13 was not rolled.

The length-weighted average fiber length of the Carbon Fiber CF1 in the thermoplastic resin pellets of Comparative Example 2, which was measured by the method described in [Measurement of length-weighted average fiber length of fibrous filler (carbon fiber or glass fiber) in resin pellet] described above, was 12 mm which was the same as the pellet length of the thermoplastic resin pellets of Comparative Example 2.

In addition, in the thermoplastic resin pellets of Comparative Example 2, the major axis D1 of the cross section of the thermoplastic resin pellets of Comparative Example 2 was 3.3 mm, the minor axis D2 thereof was 2.2 mm, and D1/D2 thereof was 1.5.

Example 2

Thermoplastic resin pellets of Example 2 were obtained under the same conditions as those in Example 1, except that the 82 parts by mass of the Carbon Fiber CF1 with respect to 100 parts by mass of LCP 1 in Example 1 was changed to 33 parts by mass of the Carbon Fiber CF1, and the die outlet was changed to a die head of φ5.0 mm.

The length-weighted average fiber length of the Carbon Fiber CF1 in the thermoplastic resin pellets of Example 2, which was measured by the method described in [Measurement of length-weighted average fiber length of fibrous filler (carbon fiber or glass fiber) in resin pellet] described above, was 12 mm which was the same as the pellet length of the thermoplastic resin pellets of Example 2.

In addition, in the thermoplastic resin pellets of Example 2, the major axis D1 of the cross section of the thermoplastic resin pellets of Example 2 was 9.0 mm, the minor axis D2 thereof was 2.2 mm, and D1/D2 thereof was 4.1.

Example 3

Thermoplastic resin pellets of Example 3 were obtained under the same conditions as those in Example 1, except that the Carbon fiber CF1 of Example 1 was changed to Carbon fiber CF2 (manufactured by Mitsubishi Chemical Corporation, PYROFIL (registered trade name) CF Tow, TR50S15L, PAN-based carbon fiber, tensile strength: 4,900 MPa, tensile elastic modulus: 235 GPa, tensile elongation: 2.1%, number-average fiber diameter: 7 μm, number of fibers: 15,000), except that the 82 parts by mass of the Carbon Fiber CF1 with respect to 100 parts by mass of LCP 1 in Example 1 was changed to 54 parts by mass of the Carbon Fiber CF2, and the die outlet was changed to a die head of φ1.5 mm.

The length-weighted average fiber length of the Carbon Fiber CF2 in the thermoplastic resin pellets of Example 3, which was measured by the method described in [Measurement of length-weighted average fiber length of fibrous filler (carbon fiber or glass fiber) in resin pellet] described above, was 12 mm which was the same as the pellet length of the thermoplastic resin pellets of Example 3.

In addition, in the thermoplastic resin pellets of Example 3, the major axis D1 of the cross section of the thermoplastic resin pellets of Example 3 was 3.5 mm, the minor axis D2 thereof was 0.8 mm, and D1/D2 thereof was 4.4.

Comparative Example 3

Thermoplastic resin pellets of Comparative Example 3 were produced under the same conditions as those in Example 3, except that the shaping roll 109 in Example 3 was removed, and the resin structural body 13 was not rolled.

The length-weighted average fiber length of the Carbon Fiber CF2 in the thermoplastic resin pellets of Comparative Example 3, which was measured by the method described in [Measurement of length-weighted average fiber length of fibrous filler (carbon fiber or glass fiber) in resin pellet] described above, was 12 mm which was the same as the pellet length of the thermoplastic resin pellets of Comparative Example 3.

In addition, in the thermoplastic resin pellets of Comparative Example 3, the major axis D1 of the cross section of the thermoplastic resin pellets of Comparative Example 3 was 1.7 mm, the minor axis D2 thereof was 1.5 mm, and D1/D2 thereof was 1.1.

Example 4

Thermoplastic resin pellets of Example 4 were obtained under the same conditions as those in Example 1, except that the Carbon Fiber CF1 of Example 1 was changed to Glass Fiber GF1 (manufactured by Nitto Boseki Co., Ltd., RS110QL483AC, E-glass, number-average fiber diameter: 17 μm, number of fibers: 3,000), the cutting length was changed so that the cutting could be carried out to a length of 5 mm in the longitudinal direction, 82 parts by mass of the Carbon Fiber CF1 with respect to 100 parts by mass of the LCP 1 was changed to 54 parts by mass of the Glass Fiber GF1 with respect to 100 parts by mass of the LCP 1, and the die outlet was changed to a die head of −1.5 mm.

The length-weighted average fiber length of the Glass Fiber GF1 in the thermoplastic resin pellets of Example 4, which was measured by the method described in [Measurement of length-weighted average fiber length of fibrous filler (carbon fiber or glass fiber) in resin pellet] described above, was 5 mm which was the same as the pellet length of the thermoplastic resin pellets of Example 4.

Comparative Example 4

Thermoplastic resin pellets of Comparative Example 4 were produced under the same conditions as those in Example 4, except that the shaping roll 109 in Example 4 was removed, and the resin structural body 13 was not rolled.

The length-weighted average fiber length of the Glass Fiber GF1 in the thermoplastic resin pellets of Comparative Example 4, which was measured by the method described in [Measurement of length-weighted average fiber length of fibrous filler (carbon fiber or glass fiber) in resin pellet] described above, was 5 mm which was the same as the pellet length of the thermoplastic resin pellets of Comparative Example 4.

Example 5

Thermoplastic resin pellets of Example 5 were obtained under the same conditions as those in Example 1, except that the LCP 1 in Example 1 was changed to LCP 2, the temperature of the melted state was changed to 360° C., the Carbon Fiber CF1 was changed to Carbon Fiber CF2, 82 parts by mass of the Carbon Fiber CF1 with respect to 100 parts by mass of the LCP 1 was changed to 54 parts by mass of the Carbon Fiber CF2 with respect to 100 parts by mass of the LCP 2, the cutting length was changed so that the cutting could be carried out to a length of 35 mm in the longitudinal direction, and the die outlet was changed to a die head of φ1.8 mm.

The length-weighted average fiber length of the Carbon Fiber CF2 in the thermoplastic resin pellets of Example 5, which was measured by the method described in [Measurement of length-weighted average fiber length of fibrous filler (carbon fiber or glass fiber) in resin pellet] described above, was 35 mm which was the same as the pellet length of the thermoplastic resin pellets of Example 5.

Comparative Example 5

Thermoplastic resin pellets of Comparative Example 5 were produced under the same conditions as those in Example 5, except that the shaping roll 109 in Example 5 was removed, and the resin structural body 13 was not rolled.

The length-weighted average fiber length of the Carbon Fiber CF2 in the thermoplastic resin pellets of Comparative Example 5, which was measured by the method described in [Measurement of length-weighted average fiber length of fibrous filler (carbon fiber or glass fiber) in resin pellet] described above, was 35 mm which was the same as the pellet length of the thermoplastic resin pellets of Comparative Example 5.

Example 6

Thermoplastic resin pellets of Example 6 were produced under the same conditions as those in Example 1, except that the Carbon fiber CF1 of Example 1 was changed to Carbon fiber CF3 (manufactured by Mitsubishi Chemical Corporation, PYROFIL (registered trade name) CF Tow, HS40 12P, PAN-based carbon fiber (tensile elastic modulus: 425 GPa), tensile strength: 4,160 MPa, tensile elongation: 1.1%, number-average fiber diameter: 5 μm, number of fibers: 24,000), 82 parts by mass of the Carbon Fiber CF1 with respect to 100 parts by mass of the LCP 1 was changed to 54 parts by mass of the Carbon Fiber CF3 with respect to 100 parts by mass of the LCP 1, and the die outlet was changed to a die head of φ1.5 mm.

The length-weighted average fiber length of the Carbon Fiber CF3 in the thermoplastic resin pellets of Example 6, which was measured by the method described in [Measurement of length-weighted average fiber length of fibrous filler (carbon fiber or glass fiber) in resin pellet] described above, was 12 mm which was the same as the pellet length of the thermoplastic resin pellets of Example 6.

In addition, in the thermoplastic resin pellets of Example 6, the major axis D1 of the cross section of the thermoplastic resin pellets of Example 6 was 4.6 mm, the minor axis D2 thereof was 0.56 mm, and D1/D2 thereof was 8.2.

Comparative Example 6

Thermoplastic resin pellets of Comparative Example 6 were produced under the same conditions as those in Example 6, except that the shaping roll 109 in Example 6 was removed, and the resin structural body 13 was not rolled.

The length-weighted average fiber length of the Carbon Fiber CF3 in the thermoplastic resin pellets of Comparative Example 6, which was measured by the method described in [Measurement of length-weighted average fiber length of fibrous filler (carbon fiber or glass fiber) in resin pellet] described above, was 12 mm which was the same as the pellet length of the thermoplastic resin pellets of Comparative Example 6.

In addition, in the thermoplastic resin pellets of Comparative Example 6, the major axis D1 of the cross section of the thermoplastic resin pellets of Comparative Example 6 was 1.8 mm, the minor axis D2 thereof was 1.2 mm, and D1/D2 thereof was 1.5.

Example 7

Thermoplastic resin pellets of Example 7 were produced under the same conditions as those in Example 6, except that in Example 6, 1 part by mass of Carbon Black CB1 (BP880, manufactured by Cabot Corporation) with respect to 100 parts by mass of LCP 1 was additionally added into the extruder 120.

The length-weighted average fiber length of the Carbon Fiber CF3 in the thermoplastic resin pellets of Example 7, which was measured by the method described in [Measurement of length-weighted average fiber length of fibrous filler (carbon fiber or glass fiber) in resin pellet] described above, was 12 mm which was the same as the pellet length of the thermoplastic resin pellets of Example 7.

In addition, in the thermoplastic resin pellets of Example 7, the major axis D1 of the cross section of the thermoplastic resin pellets of Example 7 was 4.5 mm, the minor axis D2 thereof was 0.45 mm, and D1/D2 thereof was 10.

Comparative Example 7

Thermoplastic resin pellets of Comparative Example 7 were produced under the same conditions as those in Example 7, except that the shaping roll 109 in Example 7 was removed, and the resin structural body 13 was not rolled.

The length-weighted average fiber length of the Carbon Fiber CF3 in the thermoplastic resin pellets of Comparative Example 7, which was measured by the method described in [Measurement of length-weighted average fiber length of fibrous filler (carbon fiber or glass fiber) in resin pellet] described above, was 12 mm which was the same as the pellet length of the thermoplastic resin pellets of Comparative Example 7.

In addition, in the thermoplastic resin pellets of Comparative Example 7, the major axis D1 of the cross section of the thermoplastic resin pellets of Comparative Example 7 was 1.7 mm, the minor axis D2 thereof was 1.1 mm, and D1/D2 thereof was 1.6.

[Measurement of Surface Roughness]

Using a surface roughness meter (SE600LK-31, manufactured by Kosaka Laboratory Ltd.), the arithmetic average roughness Ra, the maximum average roughness Rz, the maximum cross-sectional height Rt, the maximum peak height Rp, the maximum valley depth Rv, and the root mean square height Rq of the resin pellet of each example were determined according to the following method.

Procedure (1): A resin pellet was placed on a measurement table so that the end surface of the resin pellet was perpendicular to the measurement table, and the resin pellet and the measurement table were adhered to each other with a double-sided tape so that the resin pellet did not move.

Procedure (2): The locus of the measuring needle was set to be perpendicular to the length direction from a point which was at half the length (the pellet length) of the resin pellet in the longitudinal direction. Then, from the center point X which was at half the length (the pellet length) of the resin pellet in the longitudinal direction, a range of ±2 mm (a total of 4 mm from X1 to X2) in the longitudinal direction and the vertical direction was set as a measurement range as shown in FIG. 1.

Procedure (3): Under the measurement conditions shown below, five resin pellets were randomly taken out from the plurality of resin pellets, and the front side and the back side of each of the taken-out five resin pellets were each subjected to one measurement, whereby a total of ten times of measurements was carried out.

Procedure (4): The reference height was calibrated using a standard piece for surface property measurement SS-N21, a displacement y was determined from the reference height, the maximum cross-sectional height Rt, the arithmetic average roughness Ra, the maximum average roughness Rz, the maximum peak height Rp, the maximum valley depth Rv, and the root mean square height Rq of the surface of the resin pellet were calculated according to Expression (1) to (6) described above, and the average values of the values obtained from the total of ten times of the procedure (3) were defined as the maximum cross-sectional height Rt, the maximum average roughness Rz, the maximum peak height Rp, the maximum valley depth Rv, and the root mean square height Rq of the thermoplastic resin pellet. The results are shown in Tables 1 to 3.

| <Measurement conditions> |
|---|
| Measurement magnification: 100 times<br>Feed rate: 0.5 mm/s<br>Trace length: 1.6 mm<br>Cutoff: $\lambda c$ = 0.8 mm<br>Evaluation length: Cutoff × 5<br>Pre-length: 0 mm<br>Filter characteristic: Gaussian<br>Leveling processing: Straight line (entire area)<br>Detector: Contact PUDJ2S |

(Producing 1 of Injection-Molded Article)

Example 1

The thermoplastic resin pellets of Example 1 were charged into a hopper of an injection molding machine TR450EH3 (manufactured by Sodick Co., Ltd.) and injected into a mold having a mold temperature of 100° C. at an injection speed of 20 mm/s in the injection molding machine having a cylinder temperature of 360° C. to mold a multipurpose test piece (type A1) (thickness: 4 mm) in accordance with JIS K 7139. The gate was a film gate with a thickness of 4 mm from the upper edge of a gripping section on one side of the multipurpose test piece of Example 1.

Other injection conditions are as follows.

<<Injection Conditions>>

Screw rotation speed (plasticizing part): 100 rpm, back pressure: 0 MPa, holding pressure: 100 MPa, and holding pressure time: 5 seconds.

Examples 2 to 4, 6, and 7 and Comparative Examples 1 to 4, 6, and 7

Each of multipurpose test pieces of Examples 2 to 4, 6, and 7, and Comparative Examples 1 to 4, 6, and 7 was produced under the same conditions as those in Example 1, except that the thermoplastic resin pellets of Example 1 were each changed to the thermoplastic resin pellets of Examples 2 to 4, 6, and 7, and Comparative Examples 1 to 4, 6, and 7.

Example 5 and Comparative Example 5

Each of multipurpose test pieces of Example 5 and Comparative Example 5 was produced under the same conditions as those in Example 1, except that the thermoplastic resin pellets of Example 1 were changed to the thermoplastic resin pellets of Example 5 or Comparative Example 5, and the cylinder temperature was changed from 360° C. to 380° C.

[Measurement 1 of Metering Time]

In the above-described section of Producing 1 of injection-molded article, thirty multipurpose test pieces of each example were each continuously molded, and each of the metering times was measured for a total of 11 shots when the 15th to 25th multipurpose test pieces were subjected to molding. Next, the average value of the metering times for the 11 shots was calculated. In addition, the standard deviation was calculated from the metering time. The results are shown in Tables 1 to 3.

[Measurement 1 of Length-Weighted Average Fiber Length of Fibrous Filler (Carbon Fiber or Glass Fiber) in Injection-Molded Article]

The length-weighted average fiber length of the fibrous filler (carbon fiber or glass fiber) in the injection-molded article was measured according to the following method.

Procedure (1): A test piece having a width of 10 mm, a length of 20 mm, and a thickness of 4 mm was cut out from the central part of the multipurpose test piece of each example and heated in a muffle furnace to remove the resin content.

Regarding the heating conditions, in a case of carbon fibers, the carbon fibers were heated at 500° C. for 3 hours, and in a case of glass fibers, the glass fibers were heated at 600° C. for 4 hours.

Procedure (2): The resin content was removed from the multipurpose test piece of each example to obtain only the fibrous filler, which was subsequently dispersed in 1,000 mL of an aqueous solution containing 0.05% by volume of a surfactant (Micro 90, manufactured by INTERNATIONAL PRODUCTS CORPORATION) to prepare a fibrous filler dispersion liquid.

Procedure (3): 100 mL was extracted from the fibrous filler dispersion liquid and diluted to 10 times with pure water. 50 mL was extracted from the dispersion liquid after dilution and dispersed in a petri dish. Subsequently, the fibrous filler dispersed in the petri dish was observed with a microscope (main body: VHX-8000, lens: VH-ZOOR, manufactured by KEYENCE CORPORATION, magnification: 10 to 25 times), and five images per sample were captured such that the imaged regions did not overlap. However, when the fibrous filler was carbon fibers, 50 mL was extracted from the dispersion liquid after dilution and then filtered under reduced pressure using a $90 mm Kiriyama funnel filter paper (No. 5C), and images of the carbon fibers dispersed on the filter paper were captured.

Procedure (4): The fiber lengths of all of the five captured images were measured using image processing software (WinROOF2018, manufactured by MITANI CORPORATION) as follows.

<Method for Measuring Fiber Length>

(a) The captured images were subjected to the monochrome pixel conversion processing.

(b) Binarization processing was carried out so that only the imaged fibers were colored.

(c) The fiber length was measured using the needle shape separation function of the image processing software.

(d) The fiber length of the fiber that could not be subjected to the binarization in (c) or the fiber length of the curved fiber was measured according to the multi-point measurement, and the fiber in contact with the edge of the image was not subjected to the measurement. However, in (c) and (d), fibers of 20 μm or less were determined to be noise and not included in the number n of fibers measured. In a case of n>500, that is, when the number n of fibers measured did not exceed 500, the procedure returned to the procedure (3), additional images were captured, and the measurement was carried out until n exceeded 500.

Procedure (5): From the fiber lengths of the fibrous fillers measured in Procedure (4), the length-weighted average fiber length $lm=(\Sigma li^2\}\times ni)/(\Sigma li\times ni)$ was determined $(\Sigma ni>500)$.

li: Fiber length of fibrous filler ni: Number of fibrous fillers having fiber length li The results are shown in Tables 1 to 3.

(Producing 2 of Injection-Molded Article)

Example 1

The thermoplastic resin pellets of Example 1 were charged into a hopper of an injection molding machine TR450EH3 (manufactured by Sodick Co., Ltd.) and injected into a mold having a mold temperature of 100° C. at an injection speed of 200 mm/s in the injection molding machine having a cylinder temperature of 360° C. to produce a flat plate-shaped molded article of Example 1, which had a size of 150 mm×150 mm×thickness 4 mm.

The gate was a film gate having a thickness of 4 mm from one side of the flat plate-shaped molded article of Example 1.

Other injection conditions are as follows.

<<Injection Conditions>>

Screw rotation speed (plasticizing part): 100 rpm, back pressure: 0 MPa, holding pressure: 100 MPa, and holding pressure time: 5 seconds.

Examples 2 to 4, 6, and 7 and Comparative Examples 1 to 4, 6, and 7

Each of flat plate-shaped molded articles of Examples 2 to 4, 6, and 7, and Comparative Examples 1 to 4, 6, and 7 was produced under the same conditions as those in Example 1, except that the thermoplastic resin pellets of Example 1 were each changed to the thermoplastic resin pellets of Examples 2 to 4, 6, and 7, and Comparative Examples 1 to 4, 6, and 7.

Example 5 and Comparative Example 5

Each of flat plate-shaped molded articles of Example 5 and Comparative Example 5 was produced under the same conditions as those in Example 1, except that the thermoplastic resin pellets of Example 1 were changed to the thermoplastic resin pellets of Example 5 or Comparative Example 5, and the cylinder temperature was changed from 360° C. to 380° C.

[Measurement 2 of Metering Time]

In the above-described section of Producing 2 of injection-molded article, fifteen flat plate-shaped molded articles of each example were each continuously molded, and each of the metering times was measured for a total of 11 shots when the 3rd to 13th flat plate-shaped molded articles were subjected to molding. The average value of the metering times for the total of the 11 shots and the standard deviation thereof were calculated. The results are shown in Tables 1 to 3.

[Measurement 2 of Length-Weighted Average Fiber Length of Fibrous Filler (Carbon Fiber or Glass Fiber) in Injection-Molded Article]

The length-weighted average fiber length of the fibrous filler in the flat plate-shaped molded article of each example was measured by the same method, except that in the procedure (1) in [Measurement 1 of length-weighted average fiber length of fibrous filler (carbon fiber or glass fiber) in injection-molded article] described above, a test piece having a width of 20 mm, a length of 20 mm, and a thickness of 4 mm was cut out from the central part of the flat plate-shaped molded article of each example.

The results are shown in Tables 1 to 3.

TABLE 1

| | | | Example 1 | Comparative Example 1 | Comparative Example 2 | Example 2 |
|---|---|---|---|---|---|---|
| Composition of resin pellet | LCP1 | Part by mass | 100 | 100 | 100 | 100 |
| | Carbon Fiber CF1 | Part by mass | 82 | 82 | 82 | 33 |
| Physical properties of resin pellet | Pellet length | mm | 12 | 12 | 12 | 12 |
| | Length-weighted average fiber length | mm | 12 | 12 | 12 | 12 |

TABLE 1-continued

| | | | Example 1 | Comparative Example 1 | Comparative Example 2 | Example 2 |
|---|---|---|---|---|---|---|
| | Arithmetic average roughness Ra | μm | 6.9 | 12 | 19 | 3.0 |
| | Maximum average roughness Rz | μm | 36 | 59 | 101 | 13 |
| | Maximum cross-sectional height Rt | μm | 79 | 201 | 283 | 43 |
| | Maximum peak height Rp | μm | 15 | 32 | 47 | 5.0 |
| | Maximum valley depth Rv | μm | 21 | 27 | 54 | 8.2 |
| | Root mean square height Rq | μm | 8.8 | 15 | 25 | 38 |
| Multipurpose test piece | Metering time | s | 9.0 | 25 | 27 | 5.5 |
| | Standard deviation of metering time | s | 1.7 | 13 | 15 | 0.83 |
| | Length-weighted average fiber length in molded article | mm | 1.4 | 1.1 | 0.75 | 3.7 |
| Flat plate-shaped molded article | Metering time | s | 59 | 185 | 210 | 55 |
| | Standard deviation of metering time | s | 16 | 51 | 66 | 14 |
| | Length-weighted average fiber length in molded article | mm | 2.0 | 1.7 | 0.80 | 3.9 |

TABLE 2

| | | | Example 3 | Comparative Example 3 | Example 4 | Comparative Example 4 | Example 5 | Comparative Example 5 |
|---|---|---|---|---|---|---|---|---|
| Composition of resin pellet | LCP1 | Part by mass | 100 | 100 | 100 | 100 | — | — |
| | LCP2 | Part by mass | — | — | — | — | 100 | 100 |
| | Carbon Fiber CF2 | Part by mass | 54 | 54 | — | — | 54 | 54 |
| | Glass Fiber GF1 | Part by mass | — | — | 54 | 54 | — | — |
| Physical properties of resin pellet | Pellet length | mm | 12 | 12 | 5.0 | 5.0 | 35 | 35 |
| | Length-weighted average fiber length | mm | 12 | 12 | 5.0 | 5.0 | 35 | 35 |
| | Arithmetic average roughness Ra | μm | 10 | 12 | 8.2 | 31 | 11 | 25 |
| | Maximum average roughness Rz | μm | 37 | 55 | 36 | 182 | 50 | 140 |
| | Maximum cross-sectional height Rt | μm | 89 | 120 | 71 | 259 | 115 | 180 |
| | Maximum peak height Rp | μm | 17 | 23 | 18 | 56 | 30 | 56 |
| | Maximum valley depth Rv | μm | 20 | 33 | 18 | 126 | 25 | 84 |
| | Root mean square height Rq | μm | 12 | 15 | 10 | 39 | 10 | 33 |
| Multipurpose test piece | Metering time | s | 5.7 | 7.9 | 4.8 | 5.2 | 8.5 | 14 |
| | Standard deviation of metering time | s | 0.91 | 1.3 | 0.93 | 1.2 | 1.2 | 2.1 |
| | Length-weighted average fiber length in molded article | mm | 1.1 | 0.85 | 2.4 | 1.6 | 0.84 | 0.78 |

TABLE 2-continued

| | | | Example 3 | Comparative Example 3 | Example 4 | Comparative Example 4 | Example 5 | Comparative Example 5 |
|---|---|---|---|---|---|---|---|---|
| Flat plate-shaped molded article | Metering time | s | 45 | 65 | 43 | 79 | 52 | 85 |
| | Standard deviation of metering time | s | 4.1 | 8.8 | 3.4 | 30 | 5.3 | 10 |
| | Length-weighted average fiber length in molded article | mm | 1.9 | 0.72 | 2.0 | 1.8 | 1.5 | 0.67 |

TABLE 3

| | | | Example 6 | Comparative Example 6 | Example 7 | Comparative Example 7 |
|---|---|---|---|---|---|---|
| Composition of resin pellet | LCP1 | Part by mass | 100 | 100 | 100 | 100 |
| | Carbon Fiber CF3 | Part by mass | 54 | 54 | 54 | 54 |
| | Carbon Black CB1 | Part by mass | — | — | 1.0 | 1.0 |
| Physical properties of resin pellet | Pellet length | mm | 12 | 12 | 12 | 12 |
| | Length-weighted average fiber length | mm | 12 | 12 | 12 | 12 |
| | Arithmetic average roughness Ra | μm | 4.3 | 32 | 3.5 | 33 |
| | Maximum average roughness Rz | μm | 20 | 191 | 18 | 191 |
| | Maximum cross-sectional height Rt | μm | 30 | 263 | 27 | 270 |
| | Maximum peak height Rp | μm | 9.4 | 60 | 9.4 | 60 |
| | Maximum valley depth Rv | μm | 10 | 132 | 8.3 | 1432 |
| | Root mean square height Rq | μm | 5.0 | 39 | 4.4 | 42 |
| Multipurpose test piece | Metering time | s | 5.5 | 27 | 5.4 | 27 |
| | Standard deviation of metering time | s | 0.66 | 15 | 0.44 | 11 |
| | Length-weighted average fiber length in molded article | mm | 2.3 | 2.1 | 2.5 | 2.1 |
| Flat plate-shaped molded article | Metering time | s | 59 | 192 | 41 | 153 |
| | Standard deviation of metering time | s | 11 | 81 | 3.7 | 44 |
| | Length-weighted average fiber length in molded article | mm | 2.5 | 2.0 | 2.8 | 2.2 |

As shown in Tables 1 to 3, it has been confirmed that when the metering times during the molding of the multipurpose test piece and the flat plate-shaped molded article which have the same pellet composition are compared between Example 1 and Comparative Examples 1 and 2, between Example 3 and Comparative Example 3, between Example 4 and Comparative Example 4, between Example 5 and Comparative Example 5, between Example 6 and Comparative Example 6, and between Example 7 and Comparative Example 7, the multipurpose test pieces and the flat plate-shaped molded articles of Examples, which are produced using the thermoplastic resin pellets in which the maximum cross-sectional height Rt of the surface is less than 120 μm, have a shorter metering time during molding and a smaller standard deviation.

The preferred Examples of the present invention have been described as above; however, the present invention is not limited to these Examples. Additions, omissions, substitutions, and other modifications of the configuration can be made without departing from the spirit of the present invention. The present invention is not limited by the description described above but is limited only by the scope of the attached Claims.

REFERENCE SIGNS LIST

1P: Thermoplastic resin pellet
1: End surface
2: Outer circumferential surface
L: Pellet length

1': Cross section
D1: Major axis
D2: Minor axis
100: Producing apparatus
101 to 108: Transport rolls
109: Shaping roll
120: Extruder
121: Pre-heating part
123: Impregnation part
125: Cooling part
127: Pick-up part
129: Cutting part

What is claimed is:

1. A thermoplastic resin pellet comprising:

a thermoplastic resin (A); and a fibrous filler (B), wherein a length-weighted average fiber length of the fibrous filler (B) is 5 mm or more and less than 50 mm, a pellet length of the thermoplastic resin pellet and the length-weighted average fiber length of the fibrous filler (B) are substantially the same, a lower limit value of a major axis D1 of a cross section of the thermoplastic resin pellet is 4.1 mm or more, and a maximum cross-sectional height Rt of a surface of the thermoplastic resin pellet is less than 120 μm.

2. The thermoplastic resin pellet according to claim 1, wherein the thermoplastic resin (A) is a liquid crystal polyester resin.

3. The thermoplastic resin pellet according to claim 1, wherein the fibrous filler (B) includes a carbon fiber or a glass fiber.

4. The thermoplastic resin pellet according to claim 1, wherein an arithmetic average roughness Ra of a surface of the thermoplastic resin pellet is 11 μm or less.

5. A method for producing the thermoplastic resin pellet according to claim 1, the method comprising:

impregnating a fiber bundle which is a raw material of the fibrous filler (B), with the thermoplastic resin (A) in a melted state to obtain a strand-shaped resin structural body, rolling the strand-shaped resin structural body so that a maximum cross-sectional height Rt can be less than 120 μm; and cutting the rolled resin structural body to be pelletized.

* * * * *